(12) United States Patent
Hadapanah et al.

(10) Patent No.: US 11,987,260 B2
(45) Date of Patent: May 21, 2024

(54) METHOD AND SYSTEM FOR DRIVER ALERTS BASED ON SENSOR DATA AND CONTEXTUAL INFORMATION

(71) Applicant: CAMBRIDGE MOBILE TELEMATICS INC., Cambridge, MA (US)

(72) Inventors: Arash Hadapanah, Newton, MA (US); Hari Balakrishnan, Belmont, MA (US); Rafi Finegold, Sharon, MA (US); Samuel Madden, Newton, MA (US); Robert S. Kobetis, Cambridge, MA (US); Brian Sachetta, Boston, MA (US); Sanujit Sahoo, Waltham, MA (US); Gábor Tyukász, Budapest (HU)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/862,943

(22) Filed: Jul. 12, 2022

(65) Prior Publication Data

US 2024/0017737 A1 Jan. 18, 2024

(51) Int. Cl.
*B60W 50/16* (2020.01)
*G08G 1/0967* (2006.01)
*B60W 50/14* (2020.01)

(52) U.S. Cl.
CPC ....... *B60W 50/16* (2013.01); *G08G 1/096733* (2013.01); *G08G 1/096775* (2013.01); *B60W 2050/143* (2013.01); *B60W 2050/146* (2013.01)

(58) Field of Classification Search
CPC .......... B60W 50/16; B60W 2050/143; B60W 2050/146; G08G 1/096733; G08G 1/096775
See application file for complete search history.

(56) References Cited

U.S. PATENT DOCUMENTS

| | | | |
|---|---|---|---|
| 9,145,147 B1* | 9/2015 | Lu | F16H 61/0213 |
| 10,157,422 B2* | 12/2018 | Jordan Peters | G06Q 30/0207 |
| 2014/0132405 A1* | 5/2014 | Kiefer | B60W 50/14 340/438 |
| 2016/0061625 A1* | 3/2016 | Wang | G01C 21/3697 701/454 |
| 2016/0086285 A1 | 3/2016 | Jordan Peters et al. | |
| 2017/0210290 A1 | 7/2017 | Cordova et al. | |
| 2018/0283897 A1 | 10/2018 | Wang | |

(Continued)

OTHER PUBLICATIONS

EP23184686.6, "Extended European Search Report", Dec. 19, 2023, 10 pages.

*Primary Examiner* — Mohamed Barakat
(74) *Attorney, Agent, or Firm* — Kilpatrick Townsend & Stockton LLP

(57) ABSTRACT

A method for providing proactive driving alerts includes determining a road segment of interest, receiving GPS data and contextual data, and identifying a triggering condition in a vicinity of the segment of interest. The method also includes determining an applicability of the triggering condition to the segment of interest, retrieving an alert threshold corresponding to the triggering condition, and obtaining an action factor correlating to a user's driving behavior. The method further includes determining whether the action factor exceeds the alert threshold and providing a proactive alert related to the triggering condition to the user.

19 Claims, 16 Drawing Sheets

(56) References Cited

U.S. PATENT DOCUMENTS

| | | | |
|---|---|---|---|
| 2020/0057487 A1* | 2/2020 | Sicconi | G06T 7/254 |
| 2021/0063179 A1* | 3/2021 | Hayes | B60W 50/14 |
| 2022/0281456 A1* | 9/2022 | Giovanardi | G01S 7/4021 |

* cited by examiner

METHOD AND SYSTEM FOR DRIVER ALERTS BASED ON SENSOR DATA AND CONTEXTUAL INFORMATION

BACKGROUND OF THE INVENTION

Mobile devices, including smartphones, have been utilized in vehicles to measure driving performance of drivers by collecting and processing data from the device's location sensor, accelerometer, gyroscope, and more. Typical factors measured include hard braking, rapid acceleration, hard cornering or turning, speeding, and phone distraction.

Despite the progress made in relation to collecting data related to drivers and their driving behavior, there is a need in the art for improved systems and methods related to detecting and alerting drivers of certain driving behaviors in real-time while driving.

SUMMARY OF THE INVENTION

Embodiments of the present invention generally relate to methods and systems for providing real-time alerts for drivers. In particular embodiments, reactive, real-time alerts that inform drivers of events that have happened, for example, within a short time after the event, as well as proactive, real-time alerts that inform drivers of an event that could happen in the near future unless the driver takes corrective action, are provided. Accordingly, embodiments of the present invention provide methods to alert drivers of risky driving behaviors in real-time, while they are driving, to provide timely feedback that could improve their driving habits and reduce their risk of causing crashes. The use of the methods and systems described herein can reduce the number of vehicle accidents and increase driving safety.

Globally, driving results in 1.35 million deaths and 50 million injuries every year, with loss costs estimated at 1.8 trillion dollars. The vast majority of these incidents are caused by driver error due to a variety of factors including inattentiveness, distraction, poor anticipation, excessive speeding, recklessness, drunk driving, fatigue, a lack of awareness of the environment, and other unforeseen surprises. Many vehicles today come equipped with warning systems that warn drivers moments before a potential crash so they can take evasive action, or in some cases take evasive actions automatically (e.g., automated braking). Although helpful, these systems are not a panacea and crash rates have continued to rise in many countries. For example, in the US, road fatalities increased by 7.2% in 2020 over 2019 despite the COVID-19 pandemic significantly reducing the amount of overall driving, and the first 9 months of 2021 saw a 12% increase in fatalities over the same time period in 2020. Pedestrian and bicyclist injuries and fatalities have also been on the rise in the US since 2009.

A variety of incentive programs using insurance discounts and rewards for safe driving have been proposed and deployed to improve driving quality and reduce crash rates. These programs offer incentives and feedback on a daily, weekly, or longer time-frame, relying on drivers to react by improving their driving behavior to earn benefits.

A complementary approach to these two prior approaches—immediate warning of an impending crash on the one hand and non-real-time incentivization on the other—is to provide real-time feedback during a drive when instances of poor (or good) driving behaviors are observed. Accordingly, embodiments of the present inventionutilize this complementary approach to provide feedback via mobile devices such as smartphones and in-vehicle Internet of Things (IoT) devices to improve driving behavior. An example of an IoT device is the DriveWell Tag provided by the current assignee.

As described more fully herein, embodiments of the present invention collect sensor data from mobile devices (e.g., smartphones and IoT devices), process the sensor data in real-time during a drive, possibly augmenting this data with contextual data about the environment in which the vehicle is operating (e.g., the type of road, traffic conditions, weather, and the like) to determine if the driver or vehicle is operating in a way that indicates a higher driving risk. If so, the system can alert the driver in real-time using acoustic, visual, vibration, or other modes of alerts to notify the driver that their actions may increase their risk of experiencing a crash.

By alerting drivers of risky actions in real time, drivers will be more likely to make corrections to their behavior and reduce the risk of a crash by becoming aware of problematic behaviors and changing their habits. Real-time alerts can lower crash rates, benefiting drivers, others on the road, insurers, and society. In addition to improvements in driver safety, improvements in fuel economy can be achieved using embodiments of the present invention.

Embodiments of the present invention provide a variety of alerts, including but not limited to hard braking alerts, on mobile devices and IoT devices that are not electrically connected to the vehicle and that may be in an unknown and/or changing orientation and position within the vehicle. Thus, the embodiments described herein contrast with on-board diagnostics (OBD-II) devices that are physically mounted to the vehicle and are electrically connected to the vehicle via a wired controller area network (CAN) bus.

Numerous benefits are achieved by way of the various embodiments over conventional techniques. For example, various embodiments of the present invention provide methods and systems that give drivers real-time alerts to improve people's driving behavior and increase driving safety. These and other embodiments, along with many of its advantages and features, are described in more detail in conjunction with the text below and attached figures.

DETAILED DESCRIPTION OF SPECIFIC EMBODIMENTS

Figure 1:
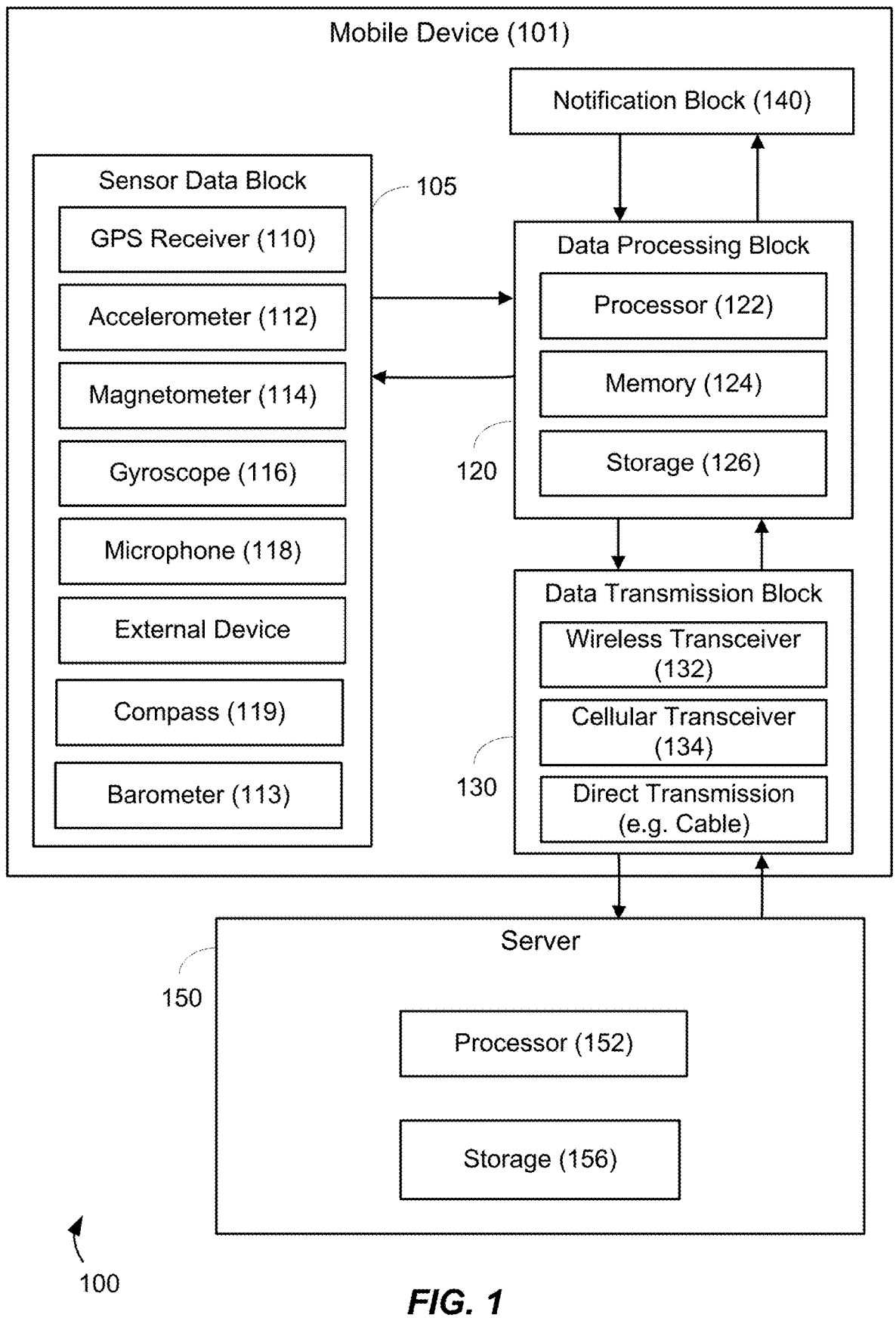
FIG. 1 is a system diagram illustrating a driving behavior detection, alert and modification system according to an embodiment of the invention.

FIG. 1 is a system diagram illustrating a driving behavior detection, alert and modification system according to an embodiment of the invention. System 100 may include a mobile device 101 having a number of different components. Mobile device 101 may include a sensor data block 105, a data processing block 120, a data transmission block 130, and a notification block 140. The sensor data block 105 may include data collection sensors as well as data collected from these sensors that are available to mobile device 101. This can include external devices connected via Bluetooth, USB cable, etc. The data processing block 120 may include storage 126, and manipulations done to the data obtained from the sensor data block 105 by processor 122. This may include, but is not limited to, analyzing, characterizing, subsampling, filtering, reformatting, etc. Data transmission block 130 may include any transmission of the data off the mobile device to an external computing device that can also store and manipulate the data obtained from sensor data block 105, such as by using a wireless transceiver 132 a cellular transceiver 134, and/or direct transmission (e.g., through a cable or other wired connection). The external computing device can be, for example, a server 150. Server 150 can comprise its own processor 152 and storage 156. Notification block 140 may report the results of analysis of sensor data performed by the data processing block 120 to a user of the mobile device 101 via a display, a speaker, a haptic alert (e.g., a vibration), etc. (not shown). The terms "notification" and "alert" may be used interchangeably herein. The functions of notification block 140 are described further herein with respect to FIG. 5, FIGS. 7-9 and FIGS. 11-17. In one embodiment, mobile device 101 may further include a scoring block (not shown) to score individual drives or trips, as described further herein with respect to FIG. 3.

Some embodiments of the present invention are described using examples where driving data is collected using a mobile device 101, and these examples are not limited to any particular mobile device. As examples, a variety of mobile devices including sensors such as GPS receivers 110, accelerometers 112, gyroscopes 116, magnetometers 114, microphones 118, compasses 119, barometers 113, location determination systems such as global positioning system (GPS) receivers 110, communications capabilities, and the like are included within the scope of some embodiments. Exemplary mobile devices include smart watches, wearable devices, fitness monitors, Bluetooth headsets, tablets, laptop computers, smartphones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip." With many mobile devices 101, the sensors used to collect data are components of the mobile device 101, and use power resources available to mobile device 101 components, e.g., mobile device battery power and/or a power source external to mobile device 101.

Some embodiments use settings of a mobile device to enable different functions described herein. For example, in Apple iOS, and/or Android OS, having certain settings enabled can enable certain functions of embodiments. For some embodiments, having location services enabled allows the collection of location information from the mobile device in the background (e.g., collected by global positioning system (GPS) sensors), and enabling background app refresh allows some embodiments to execute in the background. In some implementations, alerts (e.g., audio alerts, haptic alerts, visual alerts, etc.) are provided or surfaced using notification block 140 while the app is running in the background since the trip data capture can be performed in the background.

Figure 2:
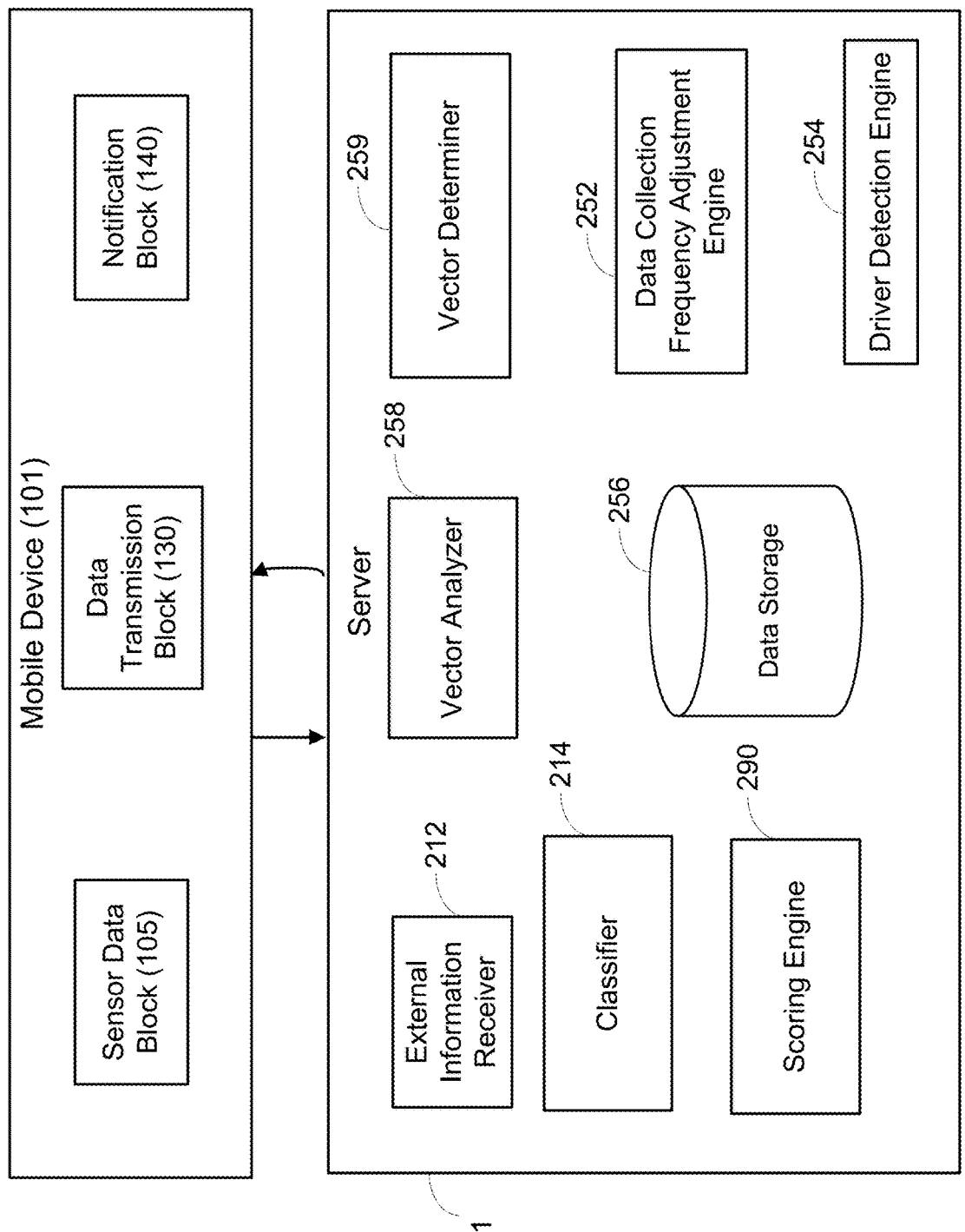
FIG. 2 is a system diagram illustrating a driving behavior detection, alert and modification system according to an embodiment of the invention.

FIG. 2 is a system diagram illustrating a driving behavior detection, alert and modification system 200 according to an embodiment of the invention. The system illustrated in FIG. 2 can be utilized for collecting driving data and can include a server 201 that communicates with mobile device 101. In some embodiments, data processing block 120 of mobile device 101 server 201 may perform functions illustrated by components included in server 201, including, but not limited to functions performed by vector analyzer 258, vector determiner 259, external information receiver 212, classifier 214, data collection frequency engine 252, and driver detection engine 254. Not all of the functionality illustrated in FIG. 2 is utilized in some embodiments. Thus, the functions of these components can be executed by mobile device 101 in conjunction with memory 124. In other embodiments, these functions are performed by the components of server 201 illustrated in FIG. 2. Server 201 may also include data storage 256. Thus, it is important to note that, while not shown, one or more of the components shown operating within server 201 can operate fully or partially within mobile device 101, and vice versa.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". Thus, embodiments of the present invention collect and process data in real time during the drive. Once the mobile device sensors have collected data (and/or in real time), some embodiments analyze the data to determine acceleration vectors for the vehicle, as well as different features of the drive. Exemplary processes detect and classify driving features using classifier 214, and determine acceleration vectors using vector analyzer 258 and vector determiner 259. In some embodiments, external data (e.g., weather) can be retrieved and correlated with collected driving data. Thus, although some embodiments are described in relation to post-processing of data collected during a drive, other embodiments utilize real time data collection and processing during the drive.

As discussed herein, some embodiments can transform collected sensor data (e.g., driving data collected using sensor data block 105) into different results, including, but not limited to, estimates of the occurrence of times where a driver was distracted. Examples of collecting driving data using sensors of a mobile device are described herein. Examples of analyzing collected driving data to detect the occurrence of driving events are also described herein. Although some embodiments are discussed in terms of distracted driving and braking events, embodiments are not limited to these particular behaviors and other driving behaviors are included within the scope of embodiments. Notifications and alerts of driving events may be made via notification block 140 of mobile device 101.

As discussed further below, some embodiments analyze collected driving data and assign scores based on different criteria. Some embodiments use scoring engine 290 to analyze relevant data and rules, and generate scores for embodiments.

Thus, although some embodiments are described in relation to the operation of server 201, other embodiments implement any or all of the components of server 201 within mobile device 101. In yet other embodiments, functionality is implemented using a combination of components in mobile device 101 and server 201. It is further contemplated that any or all of the functionalities described herein may be performed during a drive, in real time, or after a drive.

Figure 3:
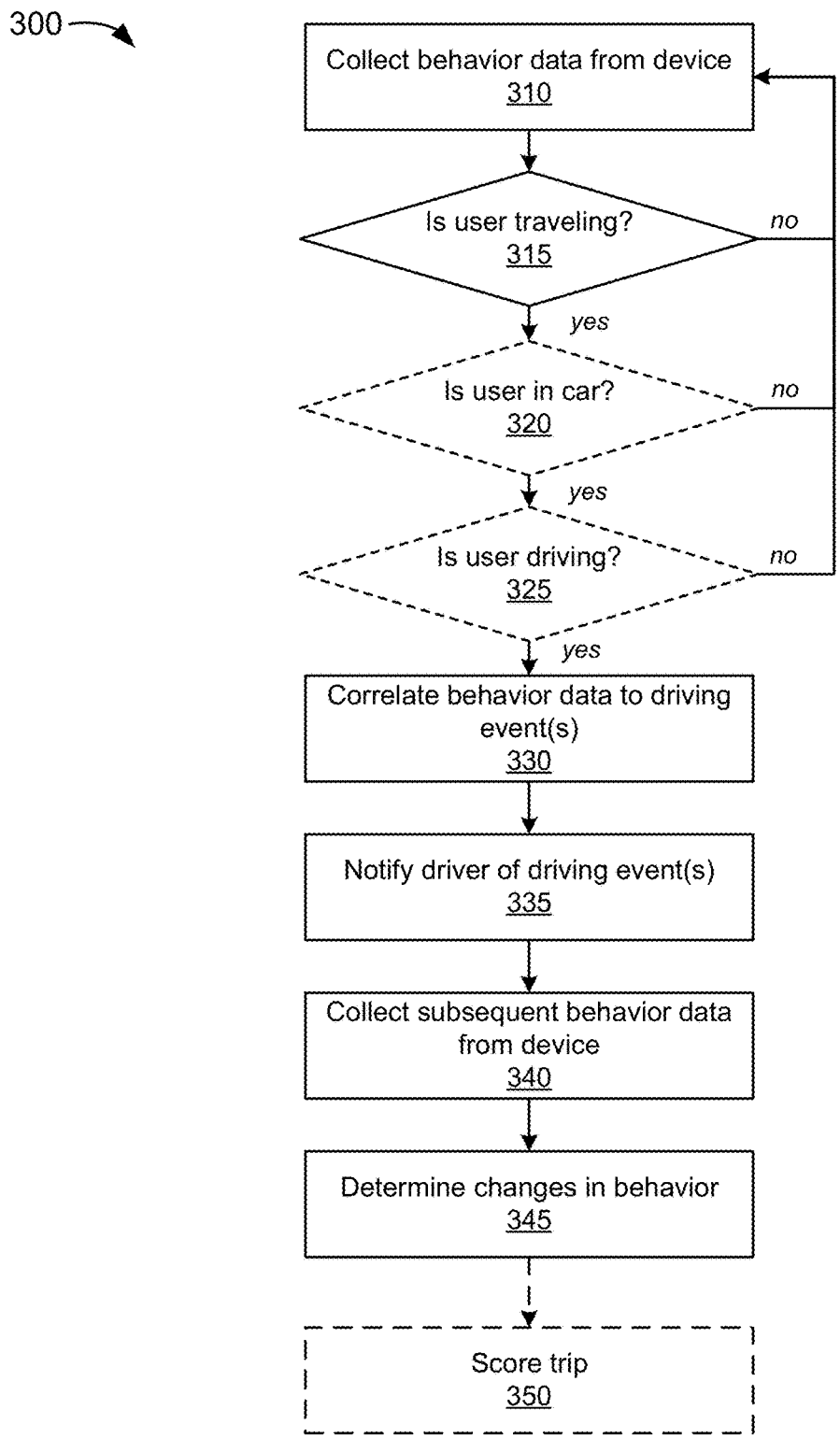
FIG. 3 is a flowchart illustrating a driving behavior detection, alert and modification method according to an embodiment of the invention.

FIG. 3 is a flowchart 300 illustrating a driving behavior detection, alert and modification method according to an embodiment of the invention. At step 310, behavior data is collected from a device. The device may be, for example, mobile device 101 of FIGS. 1 and/or 2. The behavior data may be driving data, such as that collected by one or more sensors within sensor data block 105 of FIG. 1.

At decision block 315, it is determined whether a user of the device is traveling. This may be implied, for example, by analyzing accelerometer or GPS data to determine that the device is moving in away that is indicative of traveling, i.e., on a particular path or trajectory, at a particular speed (such as above a threshold), in a particular direction, etc. Alternatively, the user may report that they are traveling although this is not performed in some implementations. If the user is not traveling, the method returns to step 310, with behavior data continuing to be collected. If the user is traveling, the method continues at decision block 320.

At decision block 320, it is optionally determined whether the user of the device is traveling in a car. Thus, in some embodiments, this step is performed, whereas in other embodiments, it is optional. This may be implied, for example, by analyzing accelerometer or GPS data to determine that the device is moving at a speed consistent with traveling by car, and by eliminating other possible modes of transportation, as discussed further herein. Alternatively, the user may report that they are traveling in a car. If the user is not traveling in a car, the method returns to step 310, with behavior data continuing to be collected. If the user is traveling in a car, the method continues at decision block 325.

At decision block 325, it is optionally determined whether the user of the device is driving. Thus, in some embodiments, this step is performed, whereas in other embodiments, it is optional. A variety of methods can be used to make this determination. It is contemplated that any of a variety of other methods may be used to determine whether the user of the device is driving. Alternatively, the user may report that they are driving. If the user is not driving, the method returns to step 310, with behavior data continuing to be collected. If the user of the device is driving, the method continues at step 330. In some embodiments, if it is determined that the user of the device is driving, this information may be transmitted to a server (e.g., server 150 of FIG. 1 and/or server 201 of FIG. 2) and shared with other users of other devices (e.g., displayed on the mobile devices of contacts within the user device). Thus, users of other devices may take actions based on the driving status of the user of the device, such as refraining from text messaging, calling, or otherwise enabling distracted driving behavior.

At step 330, the collected behavior data is correlated to one or more driving events. Driving events may include, for example, distracted driving events, hard braking events, rapid acceleration events, speeding events, cornering events, and the like. For example, data from an accelerometer or velocity sensor indicating rapid deceleration may be correlated to a hard braking event. In another example, data from an accelerometer or velocity sensor indicating a high rate of acceleration may be correlated to a rapid acceleration event. In still another example, data from an accelerometer indicating movement or manipulation of the device by the driver within the vehicle during a drive may be correlated to a distracted driving event. Detection and assessment of distracted driving events is described further in U.S. patent application Ser. No. 15/268,049, filed Sep. 16, 2016, entitled "SYSTEMS AND METHODS FOR DETECTING AND ASSESSING DISTRACTED DRIVERS", herein incorporated by reference in its entirety. The driving events may also indicate positive driving behavior, such as a lack of hard braking events, a lack of speeding events, and/or a lack of distracted driving events. Some embodiments combine data from several sources, for example, driver identification, vehicle dynamics, and the driver's interaction with the mobile device, for instance, touching the screen of the device or moving the device, while going through a corner or speeding. Cross-correlation between the classification of drivers and driving behavior and the driver's actions while driving provide benefits not available with conventional techniques. As an example, assume a person is texting for a total time of 5 seconds during a trip (e.g., because 5 seconds is the average eyes-off-road time when texting, according to a Virginia Tech Transportation Institute study, 2009). The average speed of the trip can be determined, and an alert can be delivered to let the driver better understand that his or her risky behavior effectively had his or her eyes closed for a predetermined portion (e.g., 4 seconds of eyes-off-road time at 55 mph would cover the 100-yard length of a football field) of the trip. By using a mobile device to classify and correlate behaviors, the driver's behavior that cannot be determined using an external device mounted in the vehicle are available and useful. For instance, if the driver is touching the screen during driving, this can be ascertained by embodiments of the present invention whereas this data is not available using a non-phone device. Since the mobile device (e.g., the smartphone) is used as a trip capture device by embodiments of the present invention, device handling and use during the trip can be correlated with vehicle information in new ways compared to conventional techniques.

At step 335, the driver may be notified through the device of the one or more driving events using one or more notifications. The notification can be in real time, shortly after the driving event occurs, or after the drive is over. As an example of a real time alert, an alert may be pushed to the mobile device as soon as the mobile device is handled by the driver, or after the mobile device has been handled by the driver for a certain duration. The notification can come in the form of, for example, an audio alert, a haptic alert, a visual alert, a push notification, in-application feedback, and/or the like. In some embodiments, the alerts may be customizable. For example, an audio alert may be provided in the voice of a family member to provide greater impact to the driver. In another example, the haptic alert may be customized to vibrate at a particular frequency, duration, pattern, strength, etc., such that the haptic alert of driver behavior may not be confused with another alert (e.g., a text message, phone call, etc.), which may vibrate in a different manner.

Alerts can be provided as audio alerts, which can take many forms, including information derived from sensor data, voice commands, the tone in which the message is delivered, the voice in which the message is delivered, and the like. Embodiments of the present invention enable A/B testing of various alert strategies, for example, notification during the trip versus notification after the completion of the trip. The effectiveness of the educational messages can be measured by the results measured during subsequent drives by a driver. Alerts can be tested, with the most effective alerts (e.g., for a given driver) delivered to the driver in a very driver-centric manner. The effectiveness of the messages (e.g., hard braking summary after the trip versus real-time alert through the mobile device) may be measured and vary depending on the particular driving behavior that is being addressed. The A/B testing can be performed pre-production as well as ongoing in production in an on-going, continual manner, including cycles of identifying the driver, classifying behaviors, notifying the driver, measuring effectiveness and methods, and looping back to driver identification.

Notifications can provide negative and/or positive feedback regarding the one or more driving events. In some embodiments, feedback is given immediately (i.e., in real time), whereas in other embodiments, the feedback is delayed until later in the drive, after the drive, on a periodic basis, after a certain duration of observed behavior (e.g., 30 total seconds of mobile device usage, 5 hard brakes, etc.) or the like. The processing mode in which the system operates, for example, post-processing after the drive, real-time processing during the drive, or the like can be varied depending on circumstances. As an example, if the mobile device is stationary, data can be collected and stored for later processing. However, if the mobile device is picked up, processing could shift to real-time processing either in the cloud, on the server, on the mobile device, a combination thereof, or the like. In one approach, data is sent from the mobile device to a server at the end of the trip and then processed by the server. After processing, the notifications and/or alerts may be sent to the mobile device for display or presentation to the driver. In other approaches, some of the processing of the data is performed on the mobile device and notifications are surfaced to the driver in real-time. In these implementations, some of the processing can be performed off the mobile device and results sent back as appropriate. In some embodiments, one or more alerts and/or notifications may be temporarily or permanently dismissed or turned off by shaking the mobile device. One of ordinary skill in the art would recognize many variations, modifications, and alternatives.

Turning back to FIG. 3, after the driver is notified, subsequent behavior data may be collected from the device at step 340. At step 345, changes in behavior are determined using, in one example, A/B testing. For example, if an audio alert for a "hard brake" was provided at step 335, subsequent acceleration data can be collected and analyzed to determine whether any hard braking occurred after the notification. The results of this analysis may be used to determine the efficacy of the notification in modifying or improving the driver's driving behavior. The type and timing of future notifications to the driver can be modified based on the efficacy of previous notifications.

Turning back to FIG. 3, optional step 350, the drive can be scored based on the driving events, as well as on overall driving behavior, and can be displayed to the driver in one embodiment. This score may be used to educate the driver on what good and risky driving behavior is and how they compares to other drivers. For example, a low score may be given for a driver who has 15 hard brakes in 100 miles, while the national average is 10 hard brakes or less per 100 miles.

The scoring process can include capturing the trips, determining which trips in which the user was the driver, scoring those trips, computing driver's driving behavior based on scores, and providing feedback to modify driver behavior and improving driver performance. In some embodiments, whether or not a trip is scored can be determined using driver identification to identify the driver and identification of the mode of transportation.

The scored trips can be considered as trips that the driver undertook while driving, which are indicative of the drivers behavior. Unscored trips, in a similar manner, are trips during which the user was a passenger, which, therefore, do not provide data on the driver's behavior. As an example, all trips could be determined and the trips in which the user was the driver can be scored, while the trips during which the user was not driving can be unscored. Moreover, the user can report their typical driving status (i.e., typically a driver, typically a passenger, or a combination) to help identify scorable trips. In some cases, if the certainty of the decision of driving/non-driving trips falls below a threshold, for example, if the trip appears to be a driving trip in comparison with a bus, but it is not clear if the user was driving, then the trip may not be scored. Thus, the score can be only based on driver trips in some embodiments. Further disclosure regarding the scoring of driving trips can be found in U.S. Pat. No. 11,072,339, the disclosure of which is hereby incorporated by reference in its entirety for all purposes. The other applications incorporated by reference can be useful in determining if a trip is insurable, including trip capture, driver identification, modes of transportation, and the like.

In one embodiment, the driving events may be collected by, or reported to, a central server (such as server 150 of FIG. 1, and/or server 201 of FIG. 2). The central server may use the driving event data, for example, to determine risky driving behavior. The central server may additionally or alternatively use the driving event data to determine the efficacy of notifications in modifying the behavior of particular target or driver groups. In some embodiments, high scores and/or indicators of safe driving behavior may be tracked (e.g., on a leaderboard) and/or rewarded (e.g., with tangible and/or intangible rewards). In some embodiments, driving behavior data, driving events, and/or driving scores may be shared with a central server (e.g., server 150 of FIG.

1 and/or server 201 of FIG. 2), either with identifying information or anonymized, in order to analyze the driving behavior of individual drivers and/or to aggregate data of multiple drivers to draw conclusions.

Figure 4:
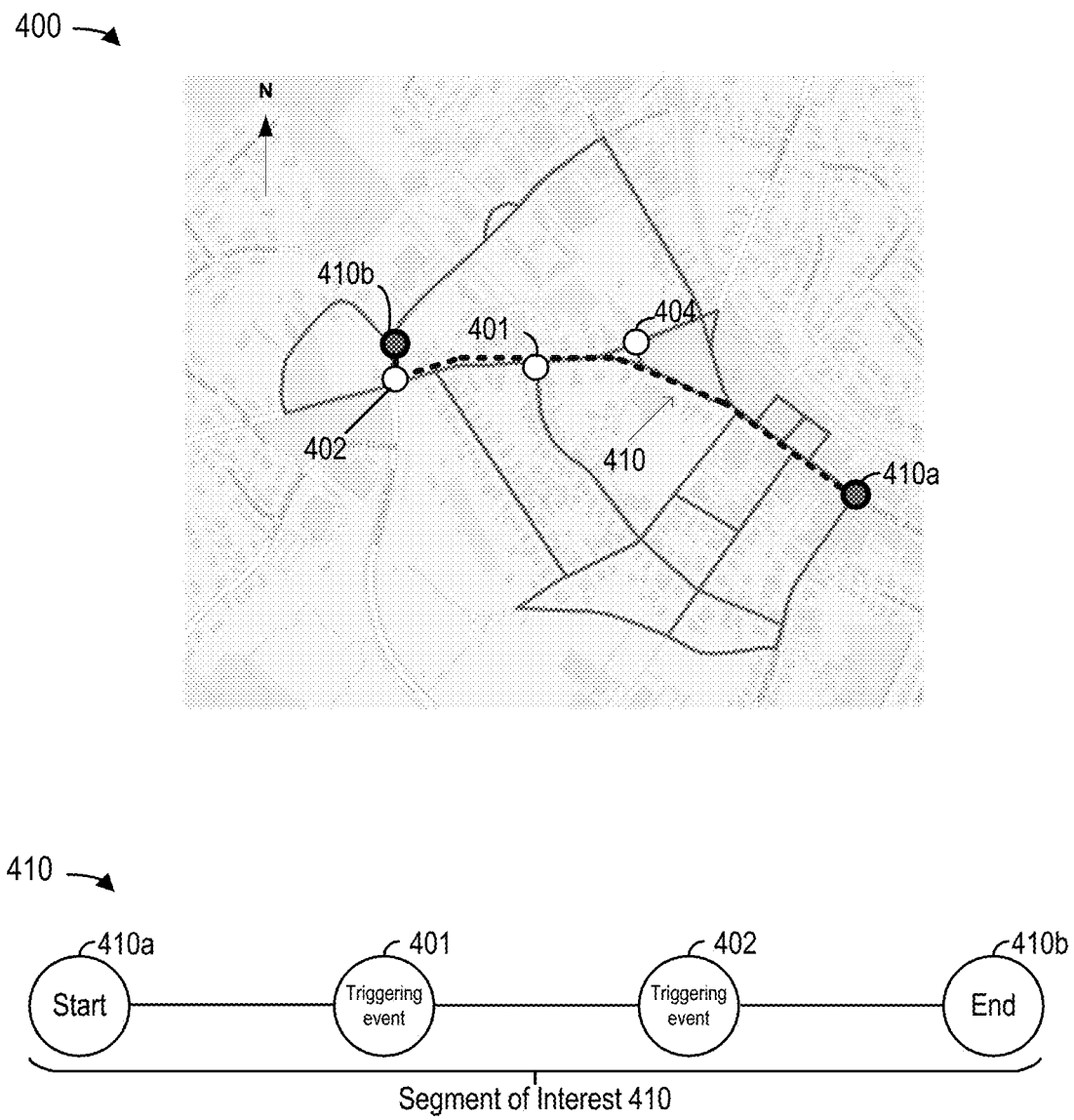
FIG. 4 illustrates a map of a segment of interest, as well as a linear graph corresponding to the segment of interest according to an embodiment of the present invention.

FIG. 4 illustrates a map of a segment of interest, as well as a linear graph corresponding to the segment of interest according to an embodiment of the present invention. As shown in map 400, a segment of interest starts at a starting point 410a and ends at an endpoint 410b. A driving path 410 within the segment of interest between starting point 410a and endpoint 410b is depicted as a dashed line on map 400. Between starting point 410a and endpoint 410b there can be multiple triggering conditions, illustrated as triggering condition 401 and triggering condition 402. Any objects, events, or conditions that might potentially affect a driver's driving behavior can constitute a triggering condition. Some examples of triggering conditions are stop signs requiring a driver to stop, traffic congestion, areas with complex traffic conditions, and locations known to have higher risk of crashes. Potential triggering condition 404 is located near the segment of interest, but does not lie on the driving path 410. As a result, potential triggering condition 404 is determined to not be applicable to the driving path 410. This determination is discussed further herein with respect to FIG. 5.

In order to conserve battery and processing resources, a limited amount of data can be obtained and cached for use in conjunction with the various methods described herein. As an example, data in the vicinity of the driver's residence, workplace, or the like, for example, data related to traffic devices and traffic conditions within a radius of 5 miles could be downloaded to the driver's mobile device. This example of 5 miles is merely exemplary and is not intended to limit embodiments of the present invention and other distances can be utilized. As a driver approaches the radius, additional data related to traffic devices and traffic conditions in a region adjacent the vicinity, for example, an area contiguous or overlapping with the vicinity in the direction of the driver's direction of travel, can be obtained.

Figure 5:
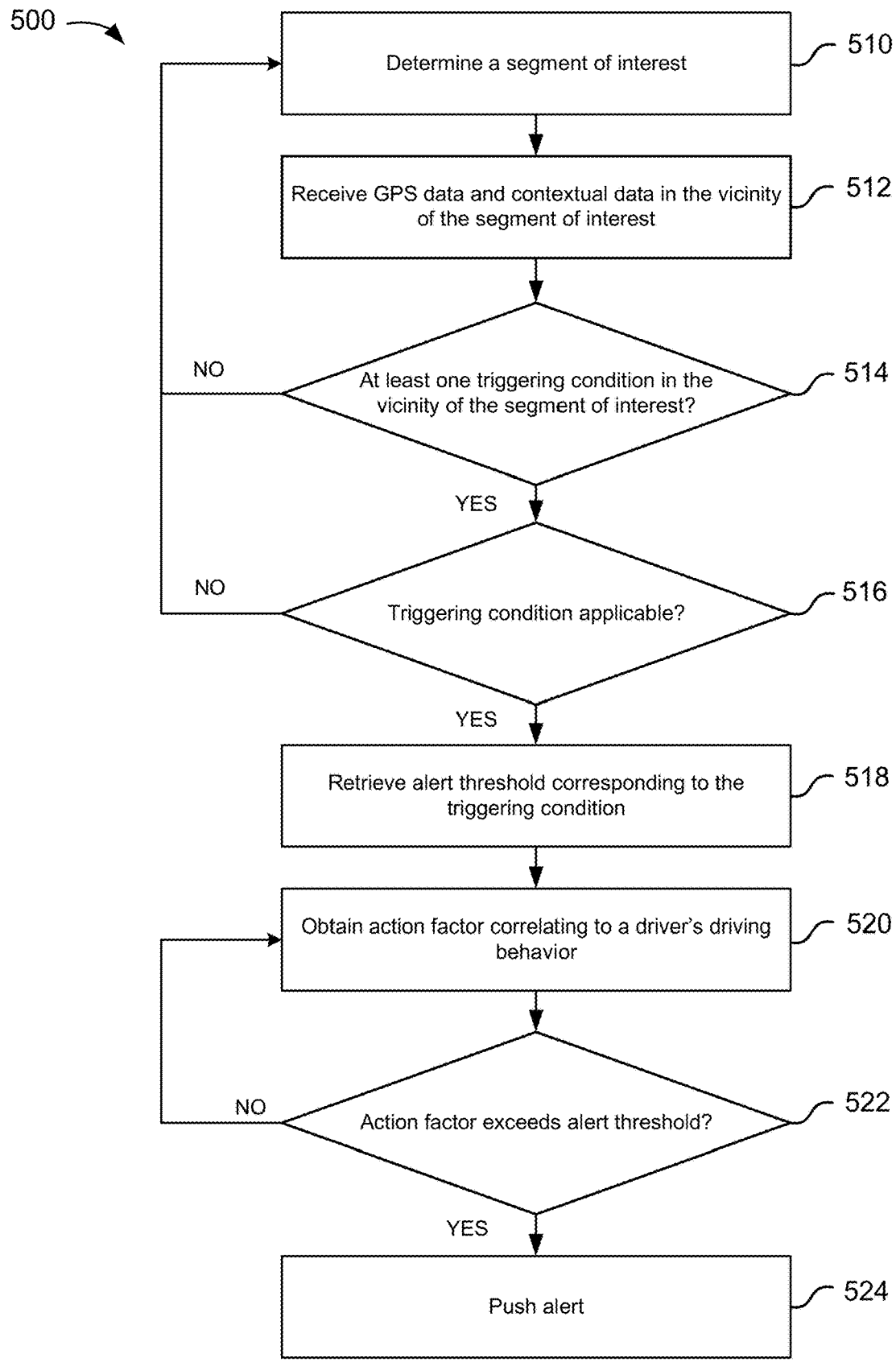
FIG. 5 is a simplified flowchart illustrating a method for determining a triggering condition and providing proactive alert according to an embodiment of the present invention.

FIG. 5 is a simplified flowchart illustrating a method for determining a triggering condition and providing a proactive alert according to an embodiment of the present invention. Method 500 can be performed by, for example, data processing block 120 of FIG. 1.

The method 500 includes determining the segment(s) of interest (510). This determination may be performed by data processing block 120 illustrated in FIG. 1. As an example, the segment(s) of interest may be determined by analyzing a driver's real-time location information data and motion data for the driver's mobile device at a certain time point during a drive. As illustrated in FIG. 4, when a driver is located at start point 410a, their location information can be determined by a location determination system. A location determination system may be included in any electronic device. For example, electronic devices may include a variety of devices that be included within or connected to mobile device 101 of FIG. 1. Examples of electronic devices include, but are not limited to, devices with one or more of location determination systems such as global positioning system (GPS) receivers 110, accelerometers 112, magnetometers 114, gyroscopes 116, microphones 118, external (sensor) devices, compasses 119, barometers 113, communications capabilities, and the like. Exemplary electronic devices include smart watches, fitness monitors, Bluetooth headsets, tablets, laptop computers, smartphones, music players, movement analysis devices, and the like.

Moreover, motion data can be collected through sensors or any electronic devices. The sensors used to collect data may be components of the mobile device 101, and use power resources available to mobile device 101 components (e.g., mobile device battery power and/or a data source external to mobile device 101). The sensor data can indicate a real-time state of motion (e.g., moving speed, acceleration, or deceleration) of the vehicle as well as an event (e.g., a crash event) that has occurred. For example, GPS receiver, accelerometer, magnetometers, and gyroscopes can indicate a speed of the vehicle, a direction of travel of the vehicle, a location of the vehicle, etc. Moreover, the barometer can output data for determination of airbag deployment as well as the mobile device's position relative to ground, both of which can be used to detect the occurrence of an event. Further, certain audio data from the microphone (e.g., a loud bang sound) can also be indicative of a crash event.

In some embodiments, the determination may be based on route data accessible from any mapping or navigation applications or devices (e.g., Google maps, built-in car GPS, portable GPS and the like).

Referring to FIG. 4, when the motion data indicates that the driver is moving in the northeastern direction at starting point 410a and the vehicle is moving at a speed of x miles/hour, an endpoint of the segment of interest can be determined to be endpoint 410b according to driver-specified preferences or processing capacities of the data processing block 120. The segment of interest is thus determined to be any available path connecting the starting point 410a and the endpoint 410b.

In block 512, the method includes receiving, for example, using data processing block 120, GPS data related to the vehicle and contextual data related to the vicinity of the segment of interest. To avoid overloading the processing block and to improve the efficiency of data processing, the method may only receive data that is within a radius of the segment of interest. The received GPS data can include real-time location of the driver, traffic or regulatory signs or devices (e.g., stop sign, rail road signs and signals, traffic light, and the like), facilities (e.g., airport, shopping mall, train station, etc.), any objects, or the existence of any events or conditions that might affect a driver's driving decision or behavior. The received contextual data may include information related to type of roads (highways, city streets, etc.), weather conditions, real-time and historical traffic conditions, time-of-day (e.g., late night, darkness, dawn/dusk, daytime), accident statistics, and the like. Alert thresholds may be adjusted depending on the contextual data.

In block 514, data processing block 120 may identify, based on the received GPS data and contextual data, whether there is at least one triggering condition that could affect a user's driving behavior. As described more fully below, based on the GPS data and the contextual data, embodiments can provide corresponding proactive alerts of such condition(s) in order to warn the user to take corrective actions beforehand. Exemplary triggering conditions can be related to, but are not limited to, traffic devices including stop signs, traffic lights, and the like, and traffic conditions including traffic congestion, high accident statistics for a high risk area, and the like.

In block 516, data processing block 120 may decide whether the identified triggering condition applies to the current driving path. Referring to FIG. 4 as an example, when a user drives along driving path 410 (depicted as a dashed line), a stop sign noted as potential triggering condition 404 may not apply to the current driving path, even though the stop sign could be located within a radius of the segment of interest. Two-way stop signs might be another example of potential triggering condition that is identified as a non-applicable triggering condition with respect to the current path. When the user drives past an intersection with a two-way stop sign that only requires drivers on the street crossing the current driving path to stop, the method can determine that the two-way stop sign should not apply to the user's current driving path and no further alerting analysis will be performed for that potential triggering condition. One exemplary method related to a stop sign as a triggering condition is discussed further herein with respect to FIG. 8.

In block 518, data processing block 120 may retrieve alert threshold corresponding to the triggering condition, for example, from the storage 156 of mobile device 101 illustrated in FIG. 1. A different alert threshold may be tailored according to different triggering conditions. The alert threshold can be, but is not limited to, a fixed value, a binary value, or a function describing a mathematical relationship between various factors. The alert threshold may be adjusted or changed depending on the contextual data. For example, when the contextual data indicates that a heavy rain weather condition is present, the braking distance formula that is used to determine the alert threshold for the braking distance can be increased since tires have less grip on wet road surfaces. Additionally, the alert threshold may be adjusted or changed depending on the identity of the user. For example, higher-risk users could be preferentially targeted or have different thresholds. Embodiments directed to triggering conditions involving stop signs, traffic congestion, high crash risk areas, and traffic lights are discussed further herein with respect to FIGS. 8-11.

In block 520, sensor data block 105 may obtain the action factor corresponding to the alert threshold of a triggering condition. Moreover, the method may also obtain action factor from any sensors that are available to mobile device 101 of FIG. 1 or any external devices connected via Bluetooth, USB cable, and the like. In some embodiments, depending on the alert threshold, the action factor can be the velocity of the car, the real-time GPS location, and the like. In some embodiments, the velocity may be obtained by accessing or reading the speedometer of the vehicle. Moreover, the velocity of the vehicle may also be obtained by analyzing the location data as a function of time using the mobile device.

In block 522, data processing block 120 may determine if the action factor exceeds the alert threshold corresponding to the triggering condition. When the action factor is determined to exceed the alert threshold, as illustrated in block 524, the notification block 140 of FIG. 1 will push alert to the driver. By way of example, a variety of alerts can be generated by embodiments of the present invention, including alerts related to speeding, hard acceleration, hard braking, the distance to vehicle in front of the driver's vehicle, lane drift, driving the wrong way on a one way road, breaking a geo-fence or entering a restricted area, hard cornering, drifting, driver fatigue, entering a school zone, entering a wild life zone, distracted driving, detection that a tag (e.g., a DriveWell Tag) is loose, or the like.

In block 524, various characteristics of the alerts may be updated and modified in response to the changes in the driver's behavior. Such alert characteristics may include, but are not limited to, the volume, the type of notification, the duration of the alert, and the like, all of which can affect a driver's behavior. One exemplary method related to updating alert characteristics in response to driver's change of behaviors is discussed further herein with respect to FIGS. 6A-6C.

As illustrated in FIG. 5, before an alert can be issued, the system can detect whether an event has occurred or will soon occur. Embodiments of the present invention utilize algorithms running on the mobile device using machine learning, signal processing, and similar techniques to determine, in real-time, when certain events occur or if certain events will soon occur if the vehicle continues on its current course. It should be noted that it is possible to stream sensor data to servers or other devices and obtain results in real-time for the same type of inferences to be drawn. While some embodiments implement the methods described herein on the mobile device or an IoT device, other embodiments implement the methods described herein using other processing systems, including cloud-based systems.

It should be appreciated that the specific steps illustrated in FIG. 5 provide a particular method for determining a triggering condition and providing proactive notifications according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention enable alerts that are configurable by the user. As an example, a mobile app could allow the driver to select the choice of audio that is utilized for different types of alerts. Thus, hard braking could result in first type of alert, for example, a beep, whereas exceeding a deceleration threshold could result in a second type of alert, for example, a voice alert. In some implementations, the alert is provided via the audio route that is being used when the alert is generated. As an example, if the mobile device is connected to the vehicle via Bluetooth, then the alert can be generated and delivered through the vehicle's speakers through the Bluetooth connection. The user-defined modality could be utilized despite the audio route currently being utilized in the vehicle. Moreover, the methods described herein can be operated in the background, i.e., the application is not foregrounded by the user, to monitor the user's safety and alert the user to increase safety.

Figure 6A:
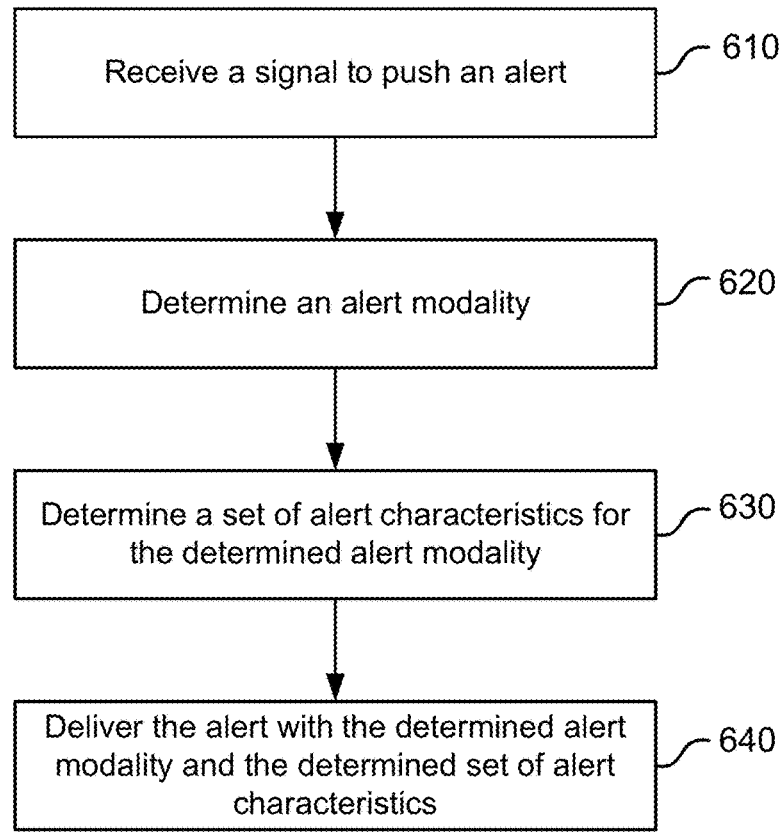
FIG. 6A illustrates a method of setting audio routing preferences according to an embodiment of the present invention.

FIG. 6A illustrates a method of setting audio routing preferences according to an embodiment of the present invention.

The method of setting audio routing preferences as illustrated by FIG. 6A may be incorporated or embedded to any methods as sub-steps in various sequences as appropriate. For example, the method illustrated in FIG. 6A may be incorporated to the method for determining a triggering condition and providing a proactive alert illustrated in FIG. 5 so that a proactive alert can be delivered to the user with determined alert modality and set of alert characteristics.

In block 610, the method includes receiving a signal to push an alert to the user. In some embodiments, the signal might be received by the notification block 140 of FIG. 1. The signal could be time-varying voltage, current, or electromagnetic wave that carries information. A person skilled in the art should conceive that the signal described herein may be in any form that carries information.

Figure 6B:
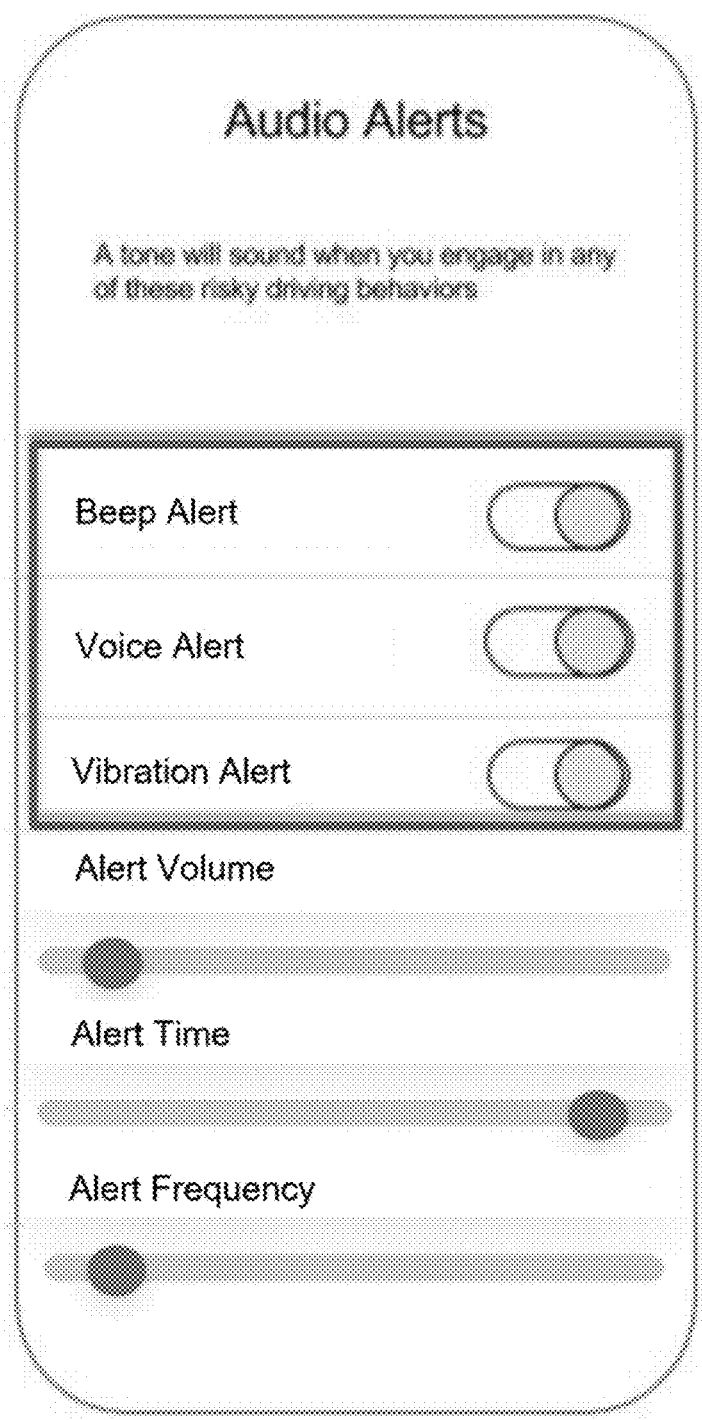
FIG. 6B illustrates a screen shot of alert modality and alert characteristics configuration according to an embodiment of the present invention.

In block 620, the method includes determining an alert modality to be delivered to a user. An alert modality refers to any form in which an alert may be presented or delivered to a user. For example, a notification can come in the form of an audio alert, a haptic alert, a visual alert, a push notification, in-application feedback, and/or the like. In some embodiments, users may configure their own customized modalities. For example, an audio alert may be provided in the voice of a family member to provide greater impact to the user. In another example, the user may select a song they like from a streaming media provider like Spotify, Apple Music, YouTube and the like. In some embodiments, a user may select their preferred modality via a mobile device. FIG. 6B provides an exemplary screen shot of modality selection.

In block 630, the method may further include determining a set of alert characteristics for the alert modality determined in block 620. The set of alert characteristics may include any features that distinguishes one alert from another under the same modality. For example, a haptic alert may be customized to vibrate at a particular frequency, duration, pattern, strength, etc., such that the haptic alert of user behavior may not be confused with another alert (e.g., a text message, phone call, etc.), which may vibrate in a different manner. The alert characteristics, may also include alert volume, the duration of the alert, the timing between the action that precipitated the alert and the delivery of the alert, the frequency at which the alerts are delivered, or the like. In addition to haptic and audio alerts, visual alerts are included within the scope of the present invention, and the alert characteristics for visual alerts can include screen brightness, color(s), duration, or the like.

In block 640, the method includes delivering the alert with the determined alert modality and the determined set of alert characteristics. In some embodiments, the alert may be any positive feedbacks such as an audio notification of "good job" or any coupons or rewards provided by any commercial partner (e.g., restaurant, gas stations, department stores, and the like). As further illustrated in FIGS. 7A and 7B, the alert can be delivered via various output routes. To improve the efficacy of alerting, the alert modality, alert output route, and set of alert characteristics can be recorded and modified based on the user's change of behavior in response to alerts being delivered.

FIG. 6B illustrates a screen shot of alert modality and alert characteristics configuration according to an embodiment of the present invention. In this specific embodiment, the user may select their preferred modality in the form of beep, voice, vibration, or any combination thereof. Besides alert modality, the user can also configure the set of alert characteristics including alert volume, alert time (e.g., each alert lasts 5 seconds), and alert frequency. In some embodiments, the alert frequency may be measured by the time gap between consecutive alerts. For example, when the alert time gap is set at 5 minutes, no alert would be played or delivered to the user until 5 minutes have lapsed after an alert was played. In some other embodiments, the alert frequency may be measured by the number of alerts being played within a period of time. For example, the user can set the maximum number of alerts can be played within a 24-hour period to 10. If the number of alerts being played has reached to 10, no alerts will be played even if a signal to push an alert is received in block 610. The illustrated alert modalities and set of alert characteristics are merely exemplary and are not intended to limit the scope of the present invention.

Accordingly, additional alert modalities and additional sets of alert characteristics are included within the scope of the present invention. One of ordinary skill in the art would recognize many variations, modifications, and alternatives.

Figure 6C:
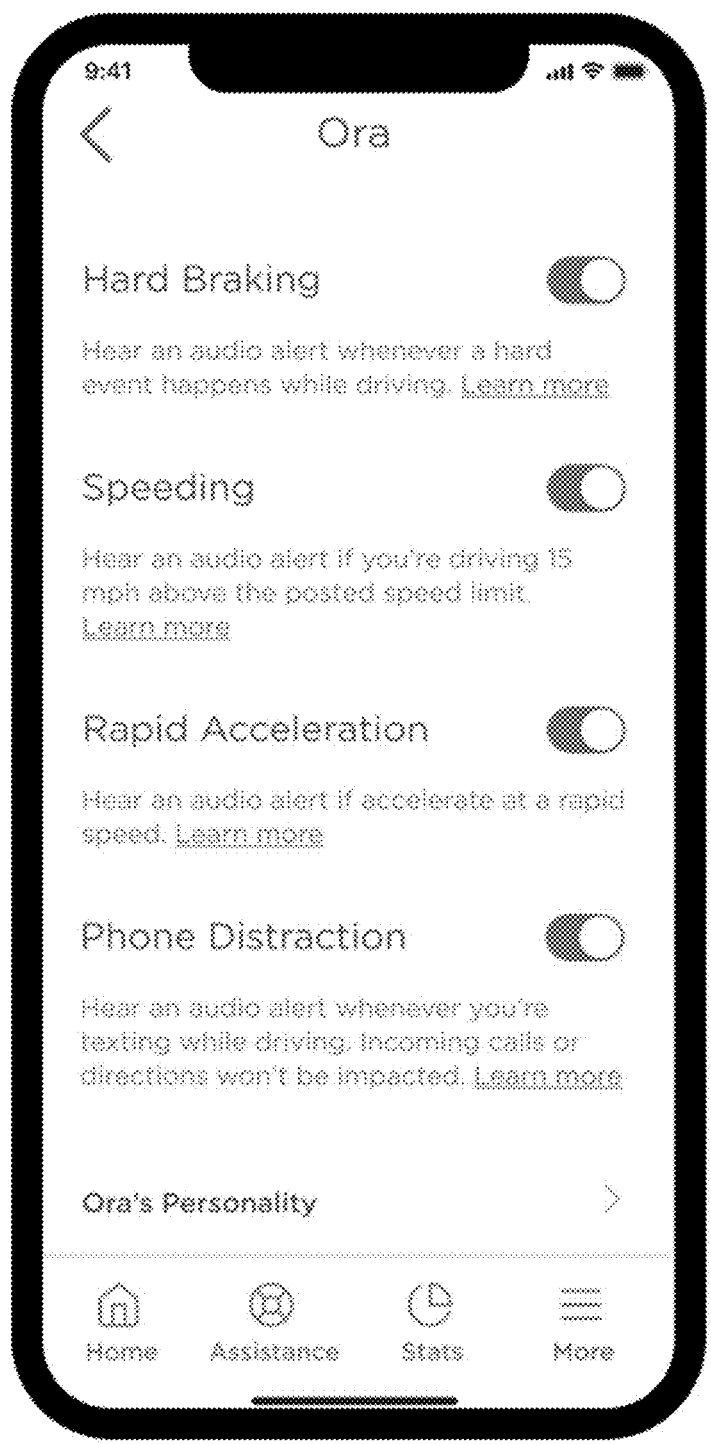
FIG. 6C illustrates a screen shot of alert type configuration according to an embodiment of the present invention.

FIG. 6C illustrates a screen shot of alert type configuration according to an embodiment of the present invention. Different types of alerts may be enabled, disabled, and configured by the user, as shown in FIG. 6C. Thus, in the embodiment illustrated in FIG. 6C, the user is able to configure an active set of alerts less than the total number of alerts provided by the system. For example, if the user does not want to receive excessive speeding alerts, there is an opt out option by which the user can turn off the speeding alert, thereby only selecting a subset of the total number of alerts that are available and for which the user could potentially receive alerts. Accordingly, the user, after turning off the speeding alert, will only receive alerts for the selected subset of the available alerts. The configuration of the active set of alerts applies to both negative alerts and positive alerts.

Additionally, the type of alerts could be targeted according to particular user segments. In some embodiments, the server 150 can generate the configuration of alert types for the user based on the user's risk evaluation or a statistical evaluation of the population. In other embodiments, the alert system may provide an AI driving coach featured with tunable personalities. For example, if the AI driving coach is set to a "strict" personality, alerts will be provided for all types of risky driving behavior. On the other hand, if the AI driving coach is set to a "normal" personality, alerts are only provided for driving behaviors that are deemed to have a risk level over a higher risk level threshold (e.g., phone distraction).

It should be appreciated that the specific steps illustrated in FIG. 6A provide a particular method of setting audio routing preferences according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the manner in which the alert is delivered to the user is a function of the type of alert that is being generated. As an example, the alerts could be acoustic, visual, haptic/vibrating, or combinations thereof. For instance, an alert in the form of acoustic feedback could be played through the mobile device's built-in speakers or through the audio route that is in use when the alert is generated. For example, some vehicles provide a hands free profile (HFP), which is a Bluetooth profile designed to enable alerts to be played via a vehicle's audio system as an incoming call, even when the audio system is set to mute or low-volume modes. Thus, even if a user is using a Bluetooth headset, the alert can be played through both the Bluetooth headset and through the mobile device. Therefore, embodiments of the present invention integrate with a variety of audio output formats and devices, including Bluetooth audio to a headset, Bluetooth audio to a vehicle's speakers, or Carplay or Android Auto-integrated audio. Moreover, a speaker on an Internet of Things (IoT) device (e.g., the DriveWell Tag available from the assignee) can be used to play an audio alert. As described herein, alerts can be integrated directly into the vehicle's infotainment system, which can include, but is not limited to a built-in display, speakers, and/or other interfaces. Additionally, alerts could be provided on wearable devices such as a smartwatch that is being worn by the user.

Figure 7A:
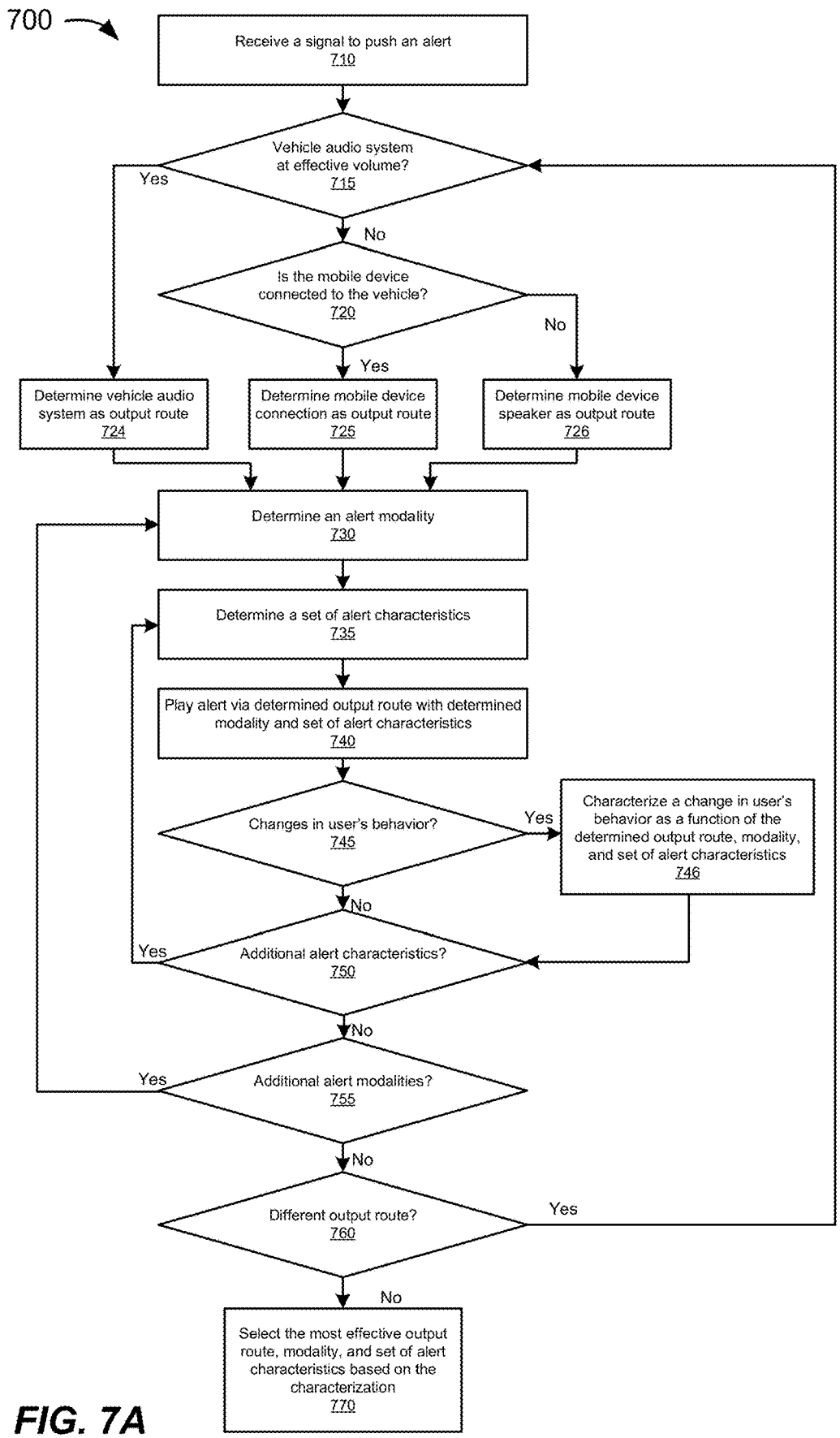
FIG. 7A is a simplified flowchart illustrating a method of selecting alert attributes according to an embodiment of the present invention.
Figure 7B:
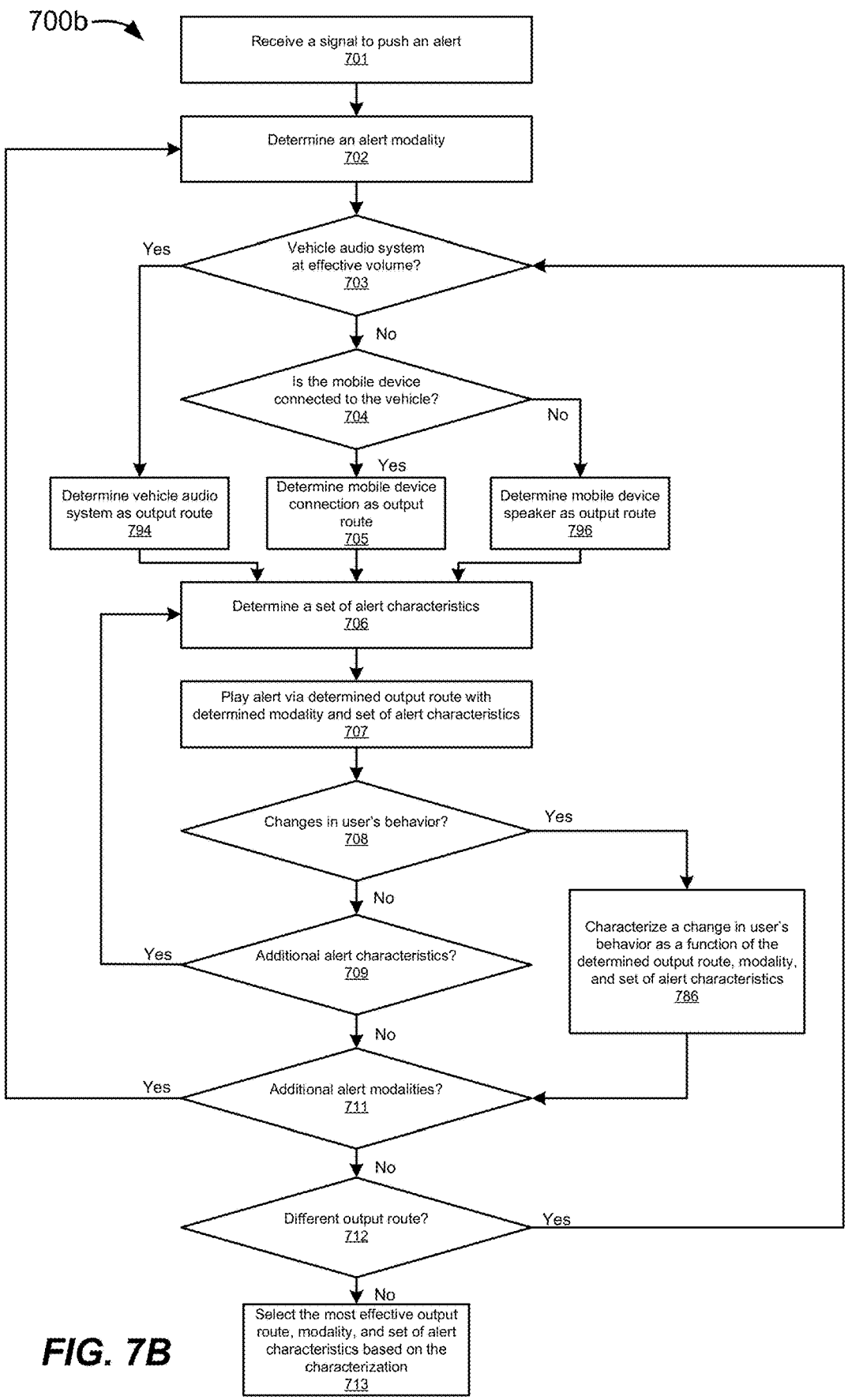
FIG. 7B is a simplified flowchart illustrating an alternative method of selecting alert attributes according to an embodiment of the present invention.

As illustrated with respect to FIGS. 7A and 7B, embodiments of the present invention provide several different ways in which the alert is presented to the user. For example, the audio could be in the form of a jingle, words, beeps, or the like. Some alerts may be better presented as visual alerts. As an example, an excessive speeding alert could be presented as a visual alert since some users exceed the speed limit frequently and repeatedly playing a sound may be annoying and not result in the desired user responsiveness. Some alerts, e.g., alerts generated in response to a user lifting or using the mobile device while driving, may be best delivered in the form of vibrations or buzzing.

The methods of presenting alerts to the user as illustrated by FIGS. 7A and 7B may be incorporated or embedded to any methods as sub-steps in various sequences as appropriate. For example, the methods illustrated in FIGS. 7A and 7B may be incorporated to the method for determining a triggering condition and providing a proactive alert illustrated in FIG. 5 so that a proactive alert can be presented to the user in several different ways.

FIG. 7A is a simplified flowchart illustrating a method of determining alert attributes according to an embodiment of the present invention. The alert attributes can be considered as cues that are provided to the user in order to measure the user's driving safety. The method may be incorporated with any methods that involve a step of notifying or pushing alerts to a user in any manner. Exemplary methods are illustrated in FIG. 5, and FIGS. 8-13.

The method 700 includes receiving a signal to push an alert to the user (710). In some embodiments, the signal can be time-varying voltage, current, or electromagnetic wave that carries information. A person skilled in the art should conceive that the signal described herein may be in any form that carries information.

In block 715, the method determines if the vehicle audio is set at an effective volume to provide sufficient notification to the user. The effective volume may be a volume selected by the user or retrieved from a database based on the user's past behavior (e.g., the car audio volume at which the user listens to music, the car audio volume threshold at which the user tends to turn down the volume, etc.). The effective volume may be selected based on statistics provided by a third-party resource (e.g., a volume, for example, a volume of 20%, at which most participants effectively react to an alert), and the like. If the vehicle audio volume is determined to be set at an effective volume, then the vehicle's audio system will be determined as the output route over which the alert will be played (724). The mobile device can be connected to the vehicle using a variety of connection options, including a wired connection or a wireless connection, for instance, via Bluetooth. As an example, if the mobile device is connected to the vehicle via Bluetooth, then the alert can be generated and delivered through the vehicle's speakers through the Bluetooth connection. In this case, the audio is delivered using an audio route similar to playing music through the Bluetooth connection. However, if the volume of the vehicle's audio system is low, the user may not be able to hear the alert. As described below, various alternative mechanisms for audio delivery can be utilized. Thus, when the vehicle audio volume is determined to be lower than the effective volume to provide sufficient notification to the user, the alert may alternatively be output via a different output route.

If it was determined that a mobile device is connected to the vehicle (720), then the method includes using the mobile device connection as the output route. The mobile device connection can be implemented via a Bluetooth connection, a Hands-Free Profile (HFP), Apple Carplay, Android Auto, a USB port, or the like. The method further includes setting the mobile device connection as the output route, which will result in the alert being played via the mobile device connection (725). For example, HFP is a Bluetooth profile designed to enable alerts to be played via a vehicle's audio system as an incoming call, even when the audio system is set to mute or low-volume modes. Accordingly, some embodiments provide the alert in a manner that is analogous to how a phone call is delivered, thereby overriding the audio level of the vehicle's audio system and playing the alert at a volume that the user can hear. Thus, in some embodiments, the use of HFP results in a method of providing that alert with increased reliability. If the mobile device is not connected to the vehicle, the alert will be played via the speaker embedded in the mobile device (726).

The method also includes determining an alert modality (730) and a set of alert characteristics (735). As described more fully below, the alert modalities can include, but are not limited to, one or more beeps, a voice prompt, a song selected by the user, a visual alert, vibration of the mobile device, and the like, and the alert characteristics can include, but are not limited to, alert volume, the alerting duration, the timing of the alert, and the like.

Given the output route, the determined alert modality, and the determined set of alert characteristics, different alerts can be presented to the user as discussed below and the alert attributes can be varied and adapted in order to utilize alerts to which the user is responsive.

Referring once again to FIG. 7A, the method includes playing the alert via the determined output route with the determined modality and the determined set of alert characteristics (740). In some embodiments, when the alert is played, the volume of the content being played by the determined output route may be reduced. Additionally, when the playing of the alert is complete, the volume of the content being played by the determined output route may be restored back to the volume before the playing of the alert. If positive changes in the user's behavior are observed (745), then the changes in the user's behavior are characterized as a function of the determined output route, the determined modality, and the determined set of alert characteristics (746).

In order to determine the impact of different sets of alert characteristics on the user, a determination is made as to whether there are additional alert characteristics that have not been utilized with the user. If so, then a new set of alert characteristics are determined (735) and the updated alert is played the next time an alert is generated. Using this feedback loop, different sets of alert characteristics are utilized, recording the set of alert characteristics that results in the highest user responsiveness.

In a similar manner, in order to determine the impact of different alert modalities on the user, once it is determined that there are no additional alert characteristics, a determination is made as to whether there are additional modalities have not been utilized with the user (755). If so, then a new alert modality is determined (730) and the updated alert using the new alert modality is played the next time an alert is generated. Using this feedback loop, different alert modalities are utilized, recording the alert modality that results in the highest user responsiveness.

In a similar manner as the determination of alert characteristics and alert modalities as discussed above, once it is determined that there are no additional alert modalities, a determination is made as to whether there are different alert output routes that have not been utilized with the user (760).

If so, then a different alert output route is selected (715). The next time an alert is generated, the alert is played via the different alert output route. Using this feedback loop, different alert output routes are utilized, recording the alert output route that results in the highest user responsiveness. Once the desired combinations of alert modalities, sets of alert characteristics, and alert output routes have been utilized, the most effective output route, alert modality, and set of alert characteristics are selected (770).

FIG. 7B is a simplified flowchart illustrating an alternative method of determining alert attributes according to an embodiment of the present invention. The alert attributes can be considered as cues that are provided to the user in order to measure the user's driving safety. The method may be incorporated with any methods that involve a step of notifying or pushing alerts to a user in any manner. Exemplary methods are illustrated in FIG. 5, and FIGS. 8-13.

The method 700b includes receiving a signal to push an alert to the user (701). In some embodiments, the signal can be time-varying voltage, current, or electromagnetic wave that carries information. A person skilled in the art should conceive that the signal described herein may be in any form that carries information.

In block 702, the method includes determining an alert modality. As described more fully below, the alert modalities can include, but are not limited to, one or more beeps, a voice prompt, a song selected by the user, a visual alert, vibration of the mobile device, and the like, and the alert characteristics can include, but are not limited to, alert volume, the alerting duration, the timing of the alert, and the like.

In block 703, the method determines if the vehicle audio is set at an effective volume to provide sufficient notification to the user. The effective volume may be a volume selected by the user or retrieved from a database based on the user's past behavior (e.g., the car audio volume at which the user listens to music, the car audio volume threshold at which the user tends to turn down the volume, etc.). The effective volume may be selected based on statistics provided by a third-party resource (e.g., a volume, for example, a volume of 20%, at which most participants effectively react to an alert), and the like. If the vehicle audio volume is determined to be set at an effective volume, then the vehicle's audio system will be determined as the output route over which the alert will be played (794). The mobile device can be connected to the vehicle using a variety of connection options, including a wired connection or a wireless connection, for instance, via Bluetooth. As an example, if the mobile device is connected to the vehicle via Bluetooth, then the alert can be generated and delivered through the vehicle's speakers through the Bluetooth connection. In this case, the audio is delivered using an audio route similar to playing music through the Bluetooth connection. However, if the volume of the vehicle's audio system is low, the user may not be able to hear the alert. As described below, various alternative mechanisms for audio delivery can be utilized. Thus, when the vehicle audio volume is determined to be lower than the effective volume to provide sufficient notification to the user, the alert may alternatively be output via a different output route.

If it was determined that a mobile device is connected to the vehicle (704), then the method includes using the mobile device connection as the output route. The mobile device connection can be implemented via a Bluetooth connection, a Hands-Free Profile (HFP), Apple Carplay, Android Auto, a USB port, or the like. The method further includes setting the mobile device connection as the output route, which will result in the alert being played via the mobile device connection (705). For example, HFP is a Bluetooth profile designed to enable alerts to be played via a vehicle's audio system as an incoming call, even when the audio system is set to mute or low-volume modes. Accordingly, some embodiments provide the alert in a manner that is analogous to how a phone call is delivered, thereby overriding the audio level of the vehicle's audio system and playing the alert at a volume that the user can hear. Thus, in some embodiments, the use of HFP results in a method of providing that alert with increased reliability. If the mobile device is not connected to the vehicle, the alert will be played via the speaker embedded in the mobile device (796).

The method also includes determining a set of alert characteristics (706). Given the output route, the determined alert modality, and the determined set of alert characteristics, different alerts can be presented to the user as discussed below and the alert attributes can be varied and adapted in order to utilize alerts to which the user is responsive.

Referring once again to FIG. 7B, the method includes playing the alert via the determined output route with the determined modality and the determined set of alert characteristics (707). If positive changes in the user's behavior are observed (708), then the changes in the user's behavior are characterized as a function of the determined output route, the determined modality, and the determined set of alert characteristics (786).

In order to determine the impact of different sets of alert characteristics on the user, a determination is made as to whether there are additional alert characteristics that have not been utilized with the user (709). If so, then a new set of alert characteristics are determined (706) and the updated alert is played the next time an alert is generated. Using this feedback loop, different sets of alert characteristics are utilized, recording the set of alert characteristics that results in the highest user responsiveness.

In a similar manner, in order to determine the impact of different alert modalities on the user, once it is determined that there are no additional alert characteristics, a determination is made as to whether there are additional modalities have not been utilized with the user (711). If so, then a new alert modality is determined (702) and the updated alert using the new alert modality is played the next time an alert is generated. Using this feedback loop, different alert modalities are utilized, recording the alert modality that results in the highest user responsiveness.

In a similar manner as the determination of alert characteristics and alert modalities as discussed above, once it is determined that there are no additional alert modalities, a determination is made as to whether there are different alert output routes that have not been utilized with the user (712). If so, then a different alert output route is determined (703). The next time an alert is generated, the alert is played via the different alert output route. Using this feedback loop, different alert output routes are utilized, recording the alert output route that results in the highest user responsiveness. Once the desired combinations of alert modalities, sets of alert characteristics, and alert output routes have been utilized, the most effective output route, alert modality, and set of alert characteristics are selected (713).

Thus, embodiments of the present invention enable the cues provided to the user via the alerts to be modified so that the most effective cues can be utilized with the user. The feedback loops illustrated in FIGS. 7A and 7B enable variations in the alert modality since some users will respond more effectively to sounds such as a beep, whereas other users will respond more effectively to audio instructions. Moreover, the feedback loops illustrated in FIGS. 7A and 7B enable variations in the alert characteristics, for example, to determine the volume level that is appropriate to each user. Overtime, using these different cues, the responsiveness of a user to the different alert attributes can be determined.

Although the methods illustrated in FIGS. 7A and 7B are based on the responsiveness of an individual user, in other embodiments and as an alternative to the user-centric methods illustrated in FIGS. 7A and 7B, information on alert attributes that are successful in obtaining increased responsiveness with other users can be utilized. One of ordinary skill in the art would recognize many variations, modifications, and alternatives.

It should be appreciated that the specific steps illustrated in FIGS. 7A and 7B provide a particular method of determining alert attributes according to an embodiment of the present invention. Other sequences of steps may also be performed according to alternative embodiments. For example, alternative embodiments of the present invention may perform the steps outlined above in a different order. Moreover, the individual steps illustrated in FIGS. 7A and 7B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
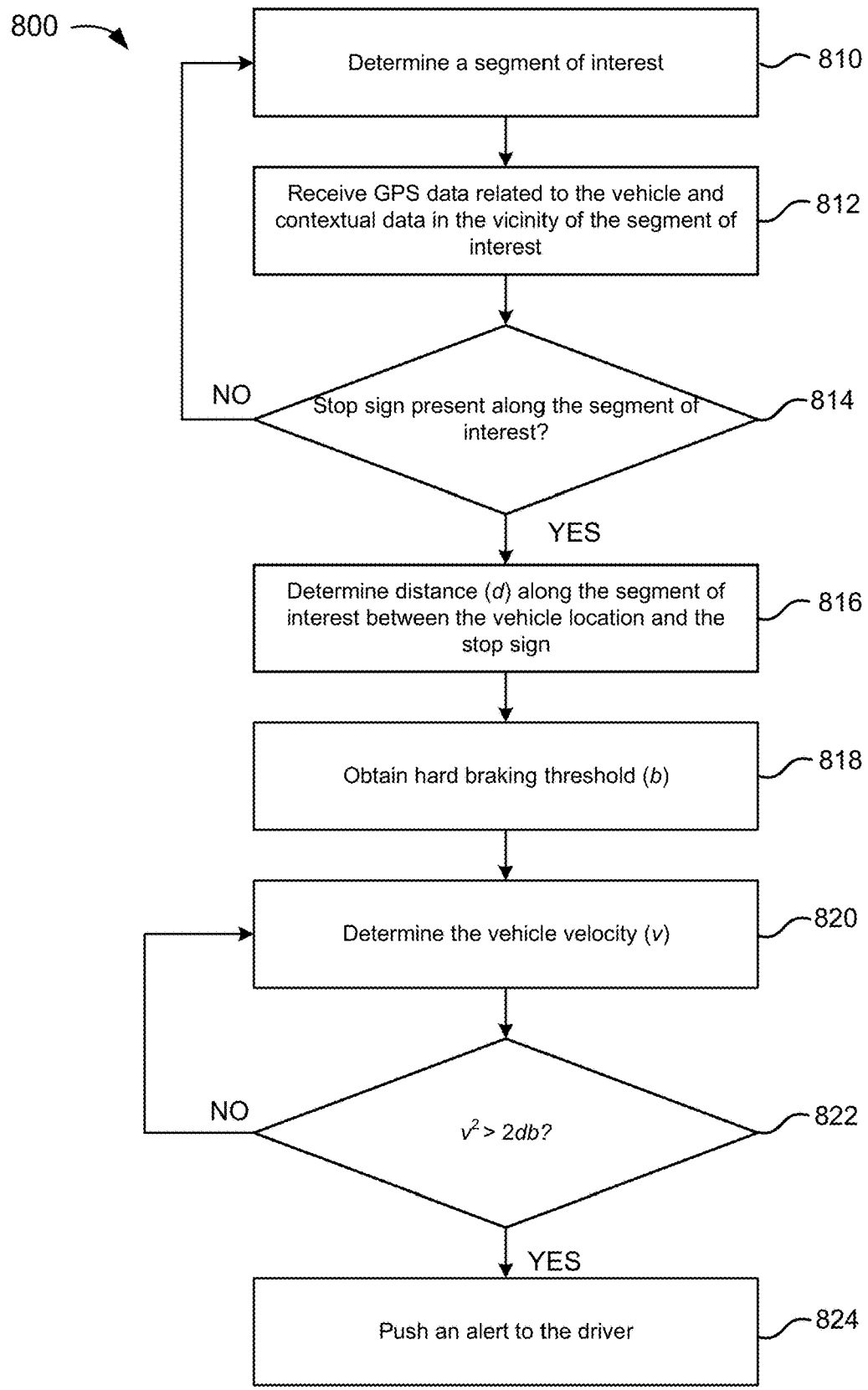
FIG. 8 is a simplified flowchart illustrating a method of alerting a driver based on proximity to a stop sign according to an embodiment of the present invention.

FIG. 8 is a simplified flowchart illustrating a method of alerting a user based on proximity to a stop sign according to an embodiment of the present invention. As described more fully in relation to FIG. 8, embodiments of the present invention provide a method of generating an alert related to a user potentially failing to stop at a stop sign, i.e., running a stop sign, thereby improving safety. Thus, a reactive hard braking alert can be triggered because the user was driving too fast and didn't anticipate braking early enough. In many cases, the system can warn the user in advance that they should slow down earlier, lest they generate a hard braking alert that might reduce their insurance discount or reward, and lest they stop abruptly.

As explained below, the method includes determining if the vehicle coming to a full stop in the distance to the stop sign would result in the vehicle exceeding a hard braking threshold. If so, then an alert can be generated. The method illustrated in FIG. 8 shares common elements with the method illustrated in FIG. 5 and the discussion provided in relation to FIG. 5 applies to FIG. 8 as appropriate.

Referring to FIG. 8, a segment of interest is determined (810) and GPS data related to the vehicle and contextual data related to the vicinity of the segment of interest is received (812). The segment of interest can include one or more streets present in a road network topology. A determination is made of whether there is a stop sign present along the segment of interest. In some embodiments, the GPS location of stop signs in the vicinity of the segment of interest is received and these GPS locations are compared to the GPS coordinates of the segment of interest. As a result, a determination can be made that there is a stop sign present along the segment of interest (814). Given the location of the vehicle, the distance d along the segment of interest between the vehicle location and the stop sign can be determined (816).

A hard braking threshold b is obtained, for example, retrieved from a server or a memory of the mobile device (818) and the vehicle velocity is determined (820). If a vehicle is driving at velocity v meters per second at a distance d meters from a stop sign, for example, then coming to a full stop would require a deceleration (i.e., braking) of magnitude $v^2/(2d)$ m/s/s. Given the hard braking threshold b m/s/s, the system can determine if $v^2 > 2$ db (822) and push an alert, i.e., a deceleration alert, to the user (824). If the hard braking threshold has not been met, then the method returns to determining the vehicle velocity (820).

As an example, b can be a defined threshold and v can be obtained from the mobile device's location services API (typically using the GPS sensor). In some cases, dis increased by a buffer value $\Delta$, e.g., increased by 25 meters, to provide enough time for the user to react. Thus, the method may include computing $d'=d+\Delta$ and alerting the user if $v^2 > 2d'b$. As will be evident to one of skill in the art, the distance required to stop without exceeding a hard braking threshold b will be a function of the velocity of the vehicle, with larger stopping distances and times being higher for higher velocities. Thus, the alert will be generated farther from the stop sign for higher velocities. It should be appreciated that the distance that would trigger an alert given the vehicle velocity could be computed and this value tracked as a function of time in order to generate the alert. One of ordinary skill in the art would recognize many variations, modifications, and alternatives.

It should be noted that navigation apps can utilize contextual data, for example, the traffic in the vicinity of the user, during their operation. However, in contrast with navigation apps that utilize a starting location and an ending location based on user's input and analyze data along the route between the starting location and the ending location, embodiments of the present invention are not constrained by a specific route. Additionally, embodiments of the present invention do not require that an app be running in the foreground on a mobile device, which contrasts with navigation apps that are launched in the foreground. Thus, the user's experience is significantly enhanced by embodiments of the present invention since the user does not need to launch an app and enter a destination in order to enjoy the benefits of the contextual data integrated with the mobile device data. Rather, for each trip the user takes, which can include every trip the user takes, the methods described herein can be operated in the background to monitor the user's safety and alert the user to increase safety.

It should be appreciated that the specific steps illustrated in FIG. 8 provide a particular method of alerting a user based on proximity to a stop sign according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
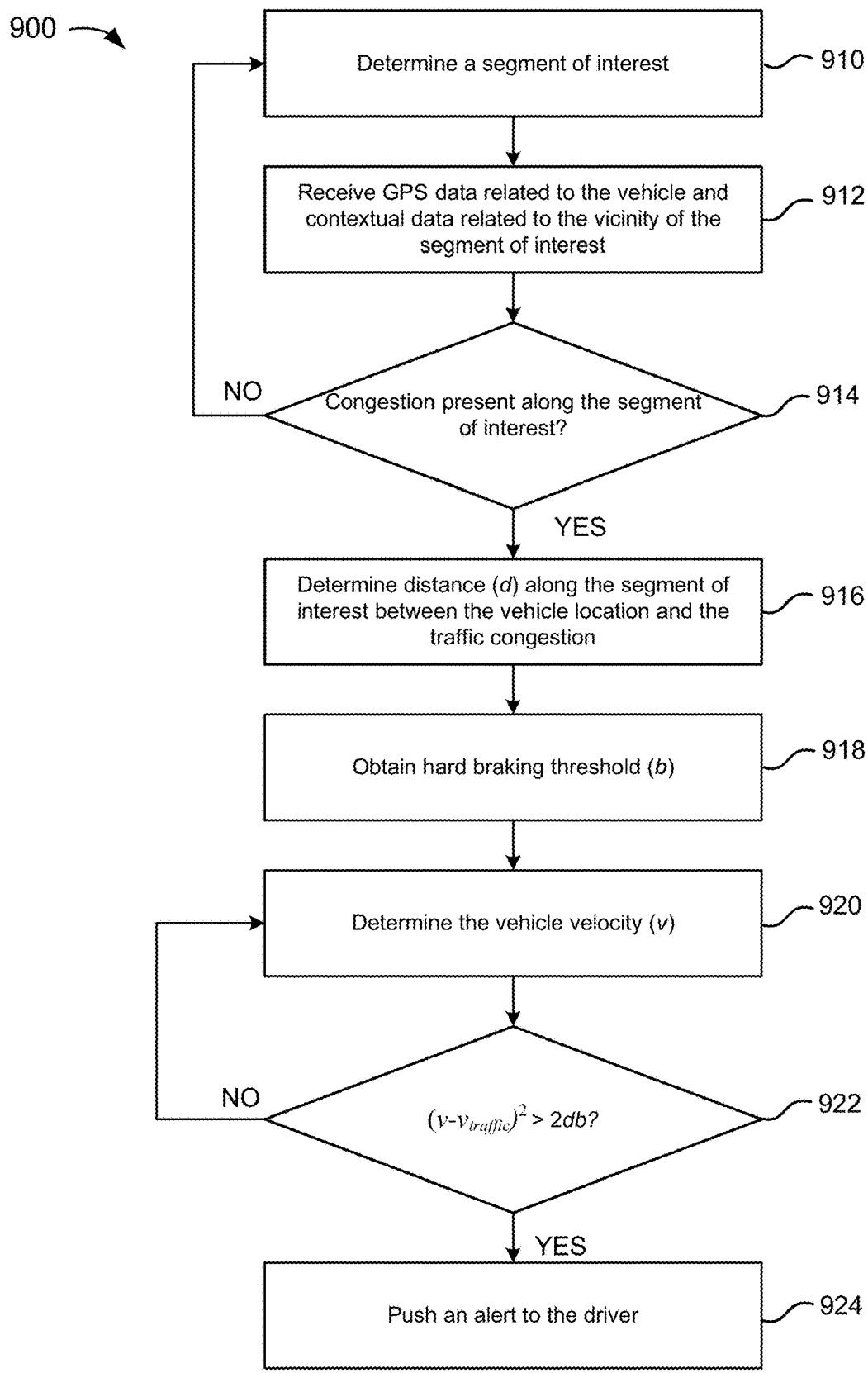
FIG. 9 is a simplified flowchart illustrating alerting a driver based on proximity to traffic congestion according to an embodiment of the present invention.

FIG. 9 is a simplified flowchart illustrating alerting a user based on proximity to traffic congestion according to an embodiment of the present invention. The method illustrated in FIG. 9 shares common elements with the method illustrated in FIG. 5 and the discussion provided in relation to FIG. 5 applies to FIG. 9 as appropriate.

In many cases there are historically known locations where traffic is typically congested at certain times of day. In these cases, the system can alert the user in advance prior to the location, perhaps even a mile in advance. Thus, embodiments of the present invention can utilize a knowledge of historic traffic bottlenecks, which can be obtained by aggregating and analyzing historical data. This method can also be used with real-time traffic information sources. Embodiments of the present invention provide benefits not available with conventional navigation apps since they can be implemented in the background without the user having launched an app prior to the driving event. Moreover, the other embodiments described herein can be utilized in combination, for example, phone distraction episodes or events, in order to provide congestion alerts that vary depending on the user's level of distraction. As an example, if it is determined that the user is distracted, for example, texting during driving, the congestion alert can be provided earlier and at a greater distance from the congestion, enabling the user to increase their attentiveness prior to reaching the area of congestion.

Referring to FIG. 9, a segment of interest is determined (910) and GPS data related to the vehicle and contextual data related to the vicinity of the segment of interest is received (912). The segment of interest can include one or more streets present in a road network topology. A determination is made of whether there is traffic congestion present along the segment of interest. In some embodiments, the GPS location(s) of traffic congestion in the vicinity of the segment of interest is received and these GPS location(s) are compared to the GPS coordinates of the segment of interest. As a result, a determination can be made that there is traffic congestion present along the segment of interest (914). Given the location of the vehicle, the distance d along the segment of interest between the vehicle location and the traffic congestion can be determined (916).

A hard braking threshold b is obtained, for example, retrieved from a server or a memory of the mobile device (918) and the vehicle velocity is determined (920). If a vehicle is driving at velocity v meters per second at a distance d meters from traffic congestion, for example, then reducing the velocity to the velocity $v_{traffic}$ of the traffic in the congested area would require a deceleration (i.e., braking) of magnitude $(v-v_{traffic})^2/(2d)$ m/s/s. Given the hard braking threshold b m/s/s, the system can determine if $(v-v_{traffic})^2>2db$ (922) and push an alert, i.e., a deceleration alert, to the user (924). If the hard braking threshold has not been met, then the method returns to determining the vehicle velocity (920).

As an example, b can be a defined threshold and v can be obtained from the mobile device's location services API (typically using the GPS sensor). In some cases, d is increased by a buffer value Δ, e.g., increased by 25 meters, to provide enough time for the user to react. Thus, the method may include computing d'=d+Δ and alerting the user if $(v-v_{traffic})^2>2d'b$. As will be evident to one of skill in the art, the distance required to slow to the traffic's speed without exceeding a hard braking threshold b will be a function of the velocity of the vehicle, with larger stopping distances and times being higher for higher velocities. Thus, the alert will be generated farther from the traffic congestion for higher velocities. It should be appreciated that the distance that would trigger an alert given the vehicle velocity could be computed and this value tracked as a function of time in order to generate the alert. One of ordinary skill in the art would recognize many variations, modifications, and alternatives.

It should be appreciated that the specific steps illustrated in FIG. 9 provide a particular method of alerting a user based on proximity to traffic congestion according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Alerts can be provided prior to entering a location a known higher risk of crashes, as determined by prior crash history data, road geometry (e.g., blind intersections, curves), and driving behavior data. Driving behavior data may indicate regions with higher distracted driving, higher speeds, or higher inattentiveness. In particular, if the vehicle is speeding or the user is distracted while approaching a segment of road where there's a merge that tends to cause collisions or where driving behavior in aggregate tends to worsen, embodiments of the present invention can alert the user so that the user can increase their attentiveness prior to entering these locations of known higher risk. This alert can also warn users in advance of complex road conditions or geometry.

Figure 10A:
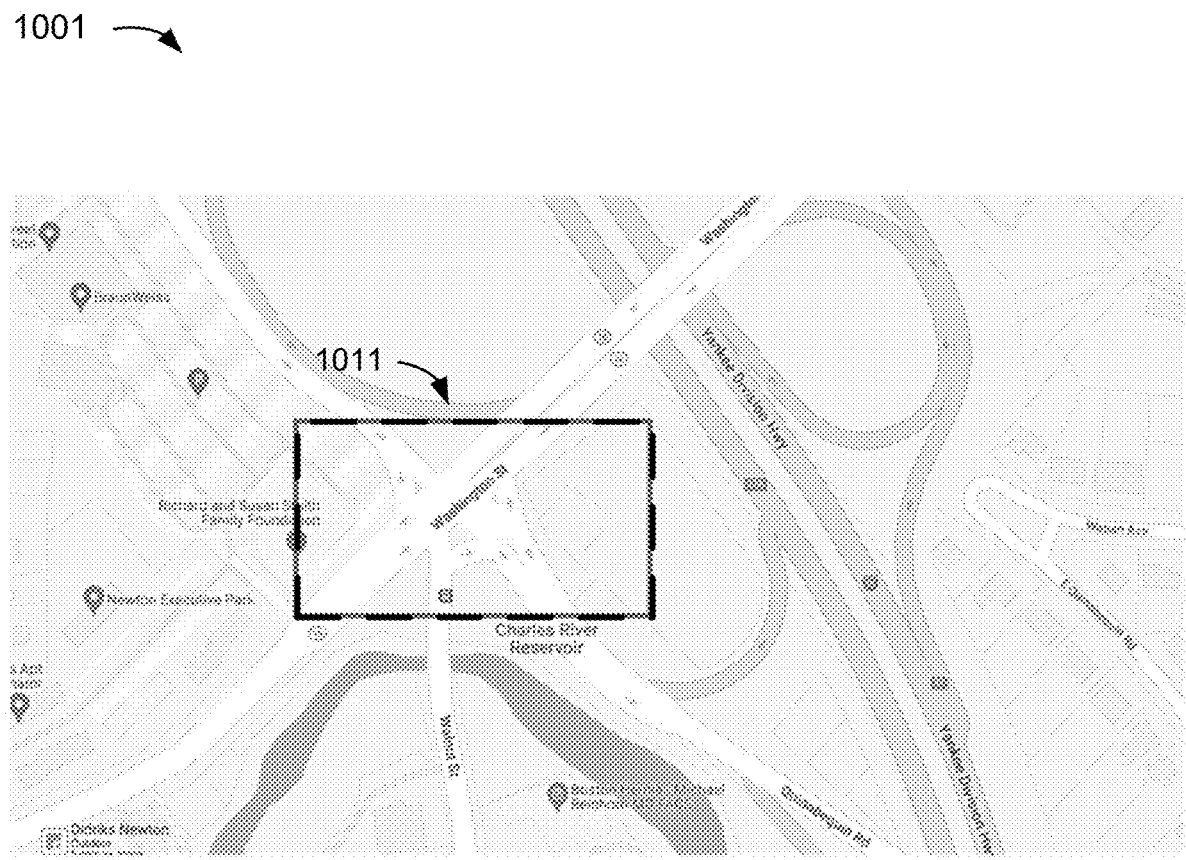
FIG. 10A is a simplified diagram illustrating a high risk area according to an embodiment of the present invention.

FIG. 10A is a simplified diagram illustrating a high risk area according to an embodiment of the present invention. In FIG. 10A, which shows a map 1001, high risk area 1011 is indicated. This high risk area 1001, which is an intersection including 8 lanes of traffic, can be historically associated with excessive braking, speeding, or phone distraction, as well an above average number of vehicle accidents. High risk areas are not limited to locations with complex traffic patterns and areas with special characteristics may also be identified as high risk areas. Thus, high risk areas include school zones (e.g., alerts can be dependent on when the school zone is "active," which includes time when school is getting out or students are going to school vs. not active, for instance weekends and nighttime) areas with falling rocks or rockfalls, areas with animal crossings (e.g., during migration periods), active construction zones, or the like. Additionally, high risk areas can include areas where there is a frequency of car crashes or incidents (within a timeframe or all time), areas with dense fog or severe weather. The identification of the high risk areas may be based on accessible historical or statistical data. Meanwhile, users may voluntarily mark high risk areas (e.g., via using a mobile device). Therefore, embodiments of the present invention provide alerts to users as they approach high risk areas, including high risk area 1011.

As an example of how embodiments of the present invention can improve driver safety, the following example is provided. Driver A gets off I-95 South via the off ramp. As they approach the intersection on Washington Street, they may not be aware that vehicles exiting Walnut St (two lanes) can only take a right turn onto Washington St. If Driver A is speeding or distracted and runs the red light, Drivers B and C exiting Walnut on a green light may collide with Driver A. Embodiments of the present invention enable the generation and delivery of proactive alerts to prevent Driver A from running the red light. A determination can be made if Driver A's speed/velocity is constant and not slowing down as they approach the intersection, a determination can be made if Driver A is distracted as they approach the intersection, and/or a determination can be made if Driver A has a high probability of running red lights. All of these determinations can factor into a proactive alert to warn Driver A and avoid a collision that could occur. Additionally, if a complex intersection like the one illustrated in FIG. 10A has a high volume of reported collisions or crashes, this can be factored into a proactive alert used to warn Driver A.

Figure 10B:
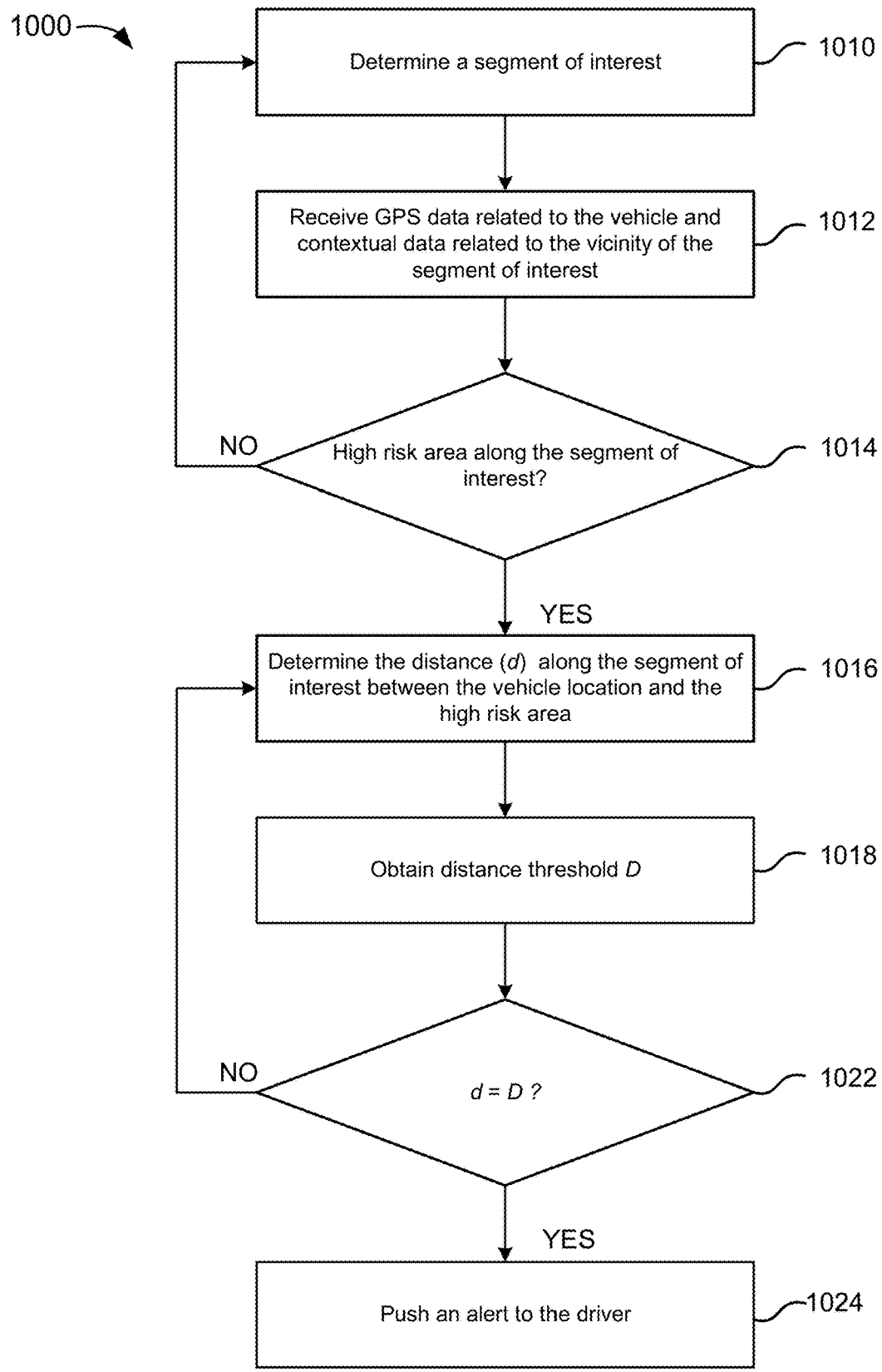
FIG. 10B is a simplified flowchart illustrating alerting a driver based on proximity to a high risk area according to an embodiment of the present invention.

FIG. 10B is a simplified flowchart illustrating alerting a user based on proximity to a high risk area according to an embodiment of the present invention. The method illustrated in FIG. 10 shares common elements with the method illustrated in FIG. 5 and the discussion provided in relation to FIG. 5 applies to FIG. 10 as appropriate.

Referring to FIG. 10B, a segment of interest is determined (1010) and GPS data related to the vehicle and contextual data related to the vicinity of the segment of interest is received (1012). The segment of interest can include one or more streets present in a road network topology. A determination is made of whether there is a high risk area present along the segment of interest. In some embodiments, the GPS location(s) of high risk area(s) in the vicinity of the segment of interest is received and these GPS location(s) are compared to the GPS coordinates of the segment of interest. As a result, a determination can be made that there is a high risk area present along the segment of interest (1014). Given the location of the vehicle, the distance d along the segment of interest between the vehicle location and the high risk area can be determined (1016).

A distance threshold D is obtained, for example, retrieved from a server or a memory of the mobile device (1018). A determination is made that the distance between the vehicle and the high risk area is equal to the distance threshold (1022) and an alert is pushed, i.e., a distance alert, to the user (1024). If the distance threshold has not been met, then the method returns to determining the distance d along the segment of interest between the vehicle location and the high risk area (1016).

It should be appreciated that the specific steps illustrated in FIG. 10B provide a particular method of alerting a user based on proximity to a high risk area according to an embodiment of the present invention. Other sequences of steps may also be performed according to alternative embodiments. For example, alternative embodiments of the present invention may perform the steps outlined above in a different order. Moreover, the individual steps illustrated in FIG. 10B may include multiple sub-steps that may be performed in various sequences as appropriate to the individual step. Furthermore, additional steps may be added or removed depending on the particular applications. One of ordinary skill in the art would recognize many variations, modifications, and alternatives.

In some cases it may be possible to obtain real-time traffic signal information about an upcoming yellow or red light. If the vehicle is traveling so fast that it would have to either drive through a red, rush through a yellow, or hard brake to stop before the light turns red (or if it is already red), alerting the user can avoid an abrupt stop or a dangerous rush-through a red or yellow.

Figure 11:
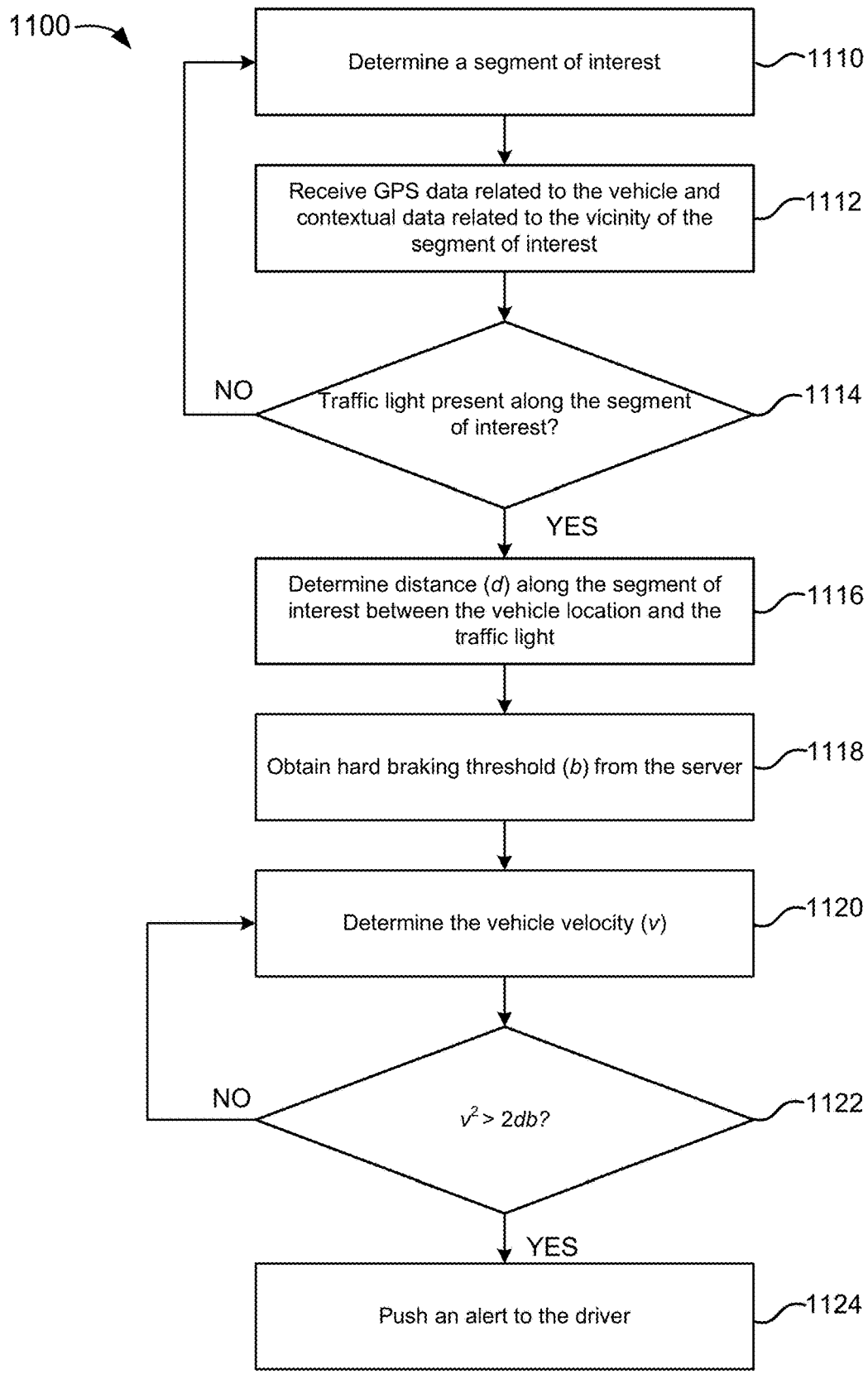
FIG. 11 is a simplified flowchart illustrating a method of alerting a driver in relation to a traffic light according to an embodiment of the present invention.

FIG. 11 is a simplified flowchart illustrating a method of alerting a user in relation to a traffic light according to an embodiment of the present invention. The method illustrated in FIG. 11 shares common elements with the method illustrated in FIG. 5 and the discussion provided in relation to FIG. 5 applies to FIG. 11 as appropriate.

Referring to FIG. 11, a segment of interest is determined (1110) and GPS data related to the vehicle and contextual data related to the vicinity of the segment of interest is received (1112). The segment of interest can include one or more streets present in a road network topology. A determination is made of whether there is a traffic light present along the segment of interest (1114). In some embodiments, the GPS location of traffic lights in the vicinity of the segment of interest is received and these GPS locations are compared to the GPS coordinates of the segment of interest. As a result, a determination can be made that there is a traffic light present along the segment of interest (1114). Given the location of the vehicle, the distance d along the segment of interest between the vehicle location and the traffic light can be determined (1116).

A hard braking threshold b is obtained, for example, retrieved from a server or a memory of the mobile device (1118) and the vehicle velocity is determined (1120). If a vehicle is driving at velocity v meters per second at a distance d meters from a traffic light that is either red or will turn red before the vehicle reaches the traffic light, for example, then coming to a full stop would require a deceleration (i.e., braking) of magnitude $v^2/(2d)$ m/s/s. Given the hard braking threshold b m/s/s, the system can determine if $v^2 > 2db$ (1122) and push an alert, i.e., a deceleration alert, to the user (1124). If the hard braking threshold has not been met, then the method returns to determining the vehicle velocity (1120).

As an example, b can be a defined threshold and v can be obtained from the mobile device's location services API (typically using the GPS sensor). In some cases, d is increased by a buffer value Δ, e.g., increased by 25 meters, to provide enough time for the user to react. Thus, the method may include computing d'=d+Δ and alerting the user if $v^2 > 2d'b$. As will be evident to one of skill in the art, the distance required to stop without exceeding a hard braking threshold b will be a function of the velocity of the vehicle, with larger stopping distances and times being higher for higher velocities. Thus, the alert will be generated farther from the traffic light for higher velocities. It should be appreciated that the distance that would trigger an alert given the vehicle velocity could be computed and this value tracked as a function of time in order to generate the alert. One of ordinary skill in the art would recognize many variations, modifications, and alternatives.

In addition to providing alerts for traffic lights that are red, if the user increases velocity moving through an intersection, this can be interpreted as the user rushing through a yellow light and an alert can be generated. Given the risk profile of the intersection, a determination that a user is rushing through a yellow light could be combined with the risk analysis described above to generate an alert.

It should be appreciated that the specific steps illustrated in FIG. 11 provide a particular method of alerting a user in relation to a traffic light according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
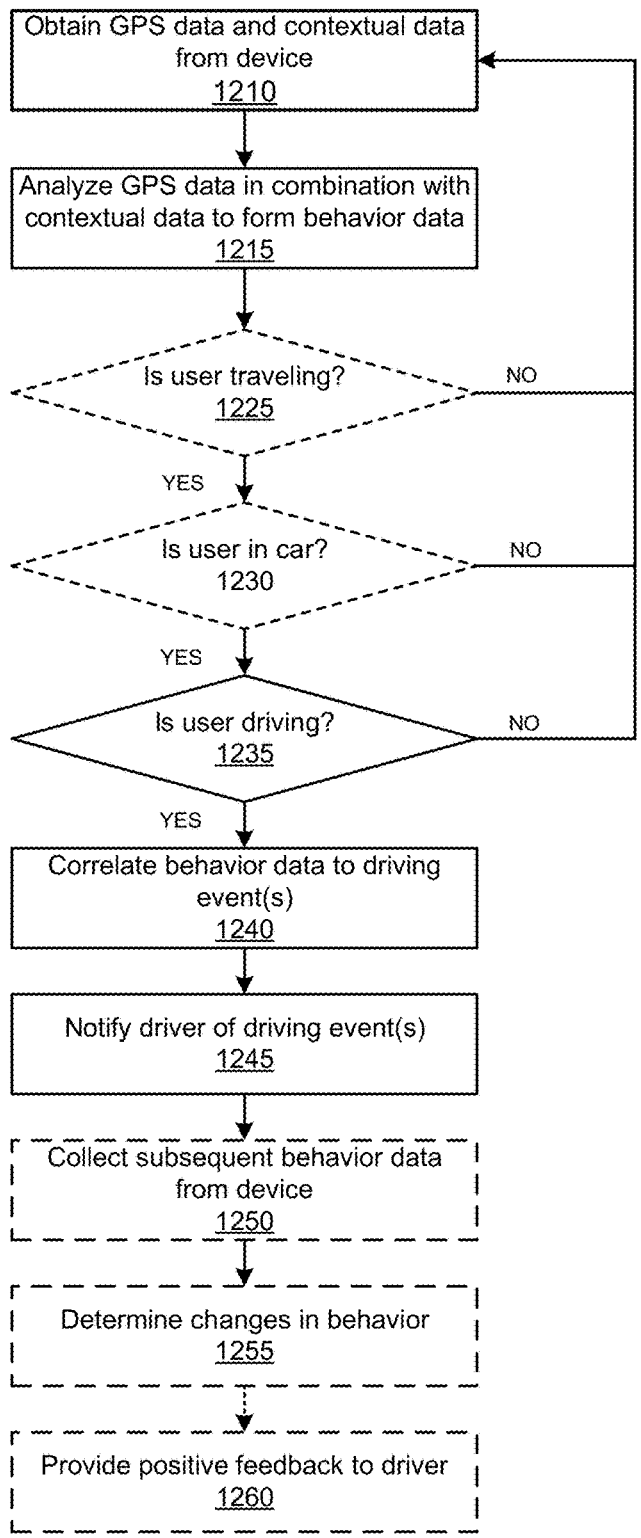
FIG. 12 is a simplified flowchart illustrating a method of providing reactive alerts to inform drivers of events that have happened according to an embodiment of the present invention.

FIG. 12 is a simplified flowchart illustrating of a method of providing reactive alerts to inform users of events that have happened according to an embodiment of the present invention. Various behavior analysis and predictions can be performed by the process. Some or all of the blocks of method 1200 can be performed by a mobile device (e.g., mobile device 101 of FIGS. 1 and 2, etc.), by a server (e.g., server 150 of FIG. 1 and server 201 of FIG. 2), or by a combination of both. The server could be provided as a component of a cloud infrastructure.

At block 1210, method 1200 involves obtaining GPS data and contextual data. The GPS data and contextual data may be collected by any electronic device or sensor. For example, a mobile device (e.g., mobile device 101 of FIGS. 1 and 2, etc.) may collect one or more types of sensor data for a vehicle, such as location and speed data (e.g., from GPS receiver 110 of FIG. 1), acceleration data (e.g., from accelerometer 112 of FIG. 1), orientation data (e.g., from magnetometer 114 and gyroscope 116 of FIG. 1), direction of travel data (e.g., from compass 119 of FIG. 1), audio data (e.g., from microphone 118 of FIG. 1), etc. Moreover, the sensor data may be collected in response to receiving a notification by the mobile device. For example, after determining that the mobile device has crossed a geofence, a notification may be issued to the mobile device to begin collecting sensor data for the vehicle. Alternatively, or additionally, the mobile device may collect and store sensor data over repeating periods of time for future analysis and processing.

The GPS data can include real-time location of the user, traffic or regulatory signs or devices (e.g., stop sign, rail road signs and signals, traffic light, and the like), facilities (e.g., airport, shopping mall, train station, etc.), any objects, or the existence of any events or conditions that might affect a user's driving decision or behavior. The received contextual data may include, but is not limited to, information related to the type of roads (highways, city streets, etc.), map data, weather conditions, real-time and/or historical traffic conditions, time-of-day (e.g., late night, darkness, dawn/dusk, daytime), accident statistics, traffic congestion data, or the like. Alert thresholds may be adjusted depending on the contextual data.

In block 1215, method 1200 involves analyzing the obtained GPS data in combination with the contextual data to form behavior data for the device user. The contextual data can provide a contextual interpretation of the GPS data to reduce the likelihood of misidentifying (or missing) a driving behavior that may cause risky consequences.

In block 1225, the method optionally determines whether a user is traveling. This may be implied, for example, by analyzing accelerometer or GPS data obtained in block 1210 to determine that the user is moving in away that is indicative of traveling, i.e., on a particular path or trajectory, at a particular speed (such as above a threshold), in a particular direction, etc. Alternatively, the user may report that they are traveling. If the user is not traveling, the method returns to step 1210, with GPS and contextual data continuing to be collected. If the user is traveling, the method continues in decision block 1230.

In decision block 1230, the method optionally determines whether the user is traveling in a car. This may be implied, for example, by analyzing accelerometer or GPS data obtained in block 1210 to determine that the user is moving at a speed consistent with traveling by car, and by eliminating other possible modes of transportation. Alternatively, the user may report that they are traveling in a car. If the user is not traveling in a car, the method returns to block 1210, with GPS and contextual data continuing to be collected. If the user is traveling in a car, the method continues in decision block 1235.

In decision block 1235, the method determines whether the user is driving. A variety of methods can be used to make this determination. It is contemplated that any of a variety of methods may be used to determine whether the user is driving. Alternatively, the user may report that they are driving. If the user is not driving, the method returns to block 1210, with GPS and contextual data continuing to be collected. If the user is driving, the method continues in block 1240. In some embodiments, if it is determined that the user is driving, this information may be transmitted to a server (e.g., server 150 of FIG. 1 and/or server 201 of FIG. 2) and shared with other users of other devices (e.g., displayed on the mobile devices of contacts within the user device). Thus, users of other devices may take actions based on the driving status of the user, such as refraining from text messaging, calling, or otherwise enabling distracted driving behavior.

In decision block 1240, the behavior data is correlated to one or more driving events that can be utilized to generate a reactive alert. These reactive alerts can be used to alert the user using an acoustic, haptic/vibration, or visual signal that an incident has occurred so they know that they might have potentially erred. Reactive alerts can be generated based, for example and without limiting embodiments of the present invention, on the following events.

Hard braking events, which can be estimated using algorithms such as those described in U.S. Pat. No. 11,072,339, the disclosure of which is hereby incorporated by reference in its entirety for all purposes. Hard braking events can be the most likely predictor of future vehicle crashes. When the magnitude of a braking event (i.e., a deceleration) exceeds a pre-defined threshold, this condition can be detected and the user can be alerted as described herein, for example, via the mobile device, for instance, a smartphone or an IoT device.

Harsh or rapid acceleration events, which can be estimated using algorithms such as those described in U.S. Pat. Nos. 9,228,836 and 11,072,339. When the magnitude of a forward acceleration event exceeds a pre-defined threshold, this condition can be detected and the user can be alerted as described herein, for example, via the mobile device, for instance, a smartphone or an IoT device. Harsh or rapid acceleration events include hash cornering (i.e., swerving or turning) events. The lateral direction is perpendicular to the forward direction in the plane of driving of the vehicle. When the magnitude of a lateral acceleration event exceeds a pre-defined threshold, the condition can be detected and the user can be alerted as described herein, for example, via the mobile device, for instance a smartphone or an IoT device.

Excessive speeding above the posted speed limit on a road, or above the posted speed limit plus a road-dependent speed buffer, or above a certain percentile of historic traffic on that road, or above the speed of current traffic on that road.

Phone distraction episodes or events, estimated using algorithms such as those described in U.S. Pat. Nos. 10,158, 977, 10,672,249, and 10,759,441, the disclosure of which is hereby incorporated by reference in its entirety for all purposes. When such an episode or event is detected, the phone alerts the user. These alerts may also take into account whether a stop sign or traffic light or traffic congestion is upcoming or present. Embodiments of the present invention allow the user to specify that they are not the driver when a phone distraction episode is detected as it is possible that the phone belongs to a passenger, or that the phone belongs to the driver but is currently being used by the passenger. Allowing the user to provide this feedback will improve usability and help users obtain feedback only when they are distracted by the phone while driving. The mode of transportation can be analyzed as described in U.S. Pat. Nos. 9,900,747 and 10,072,932, the disclosure of which is hereby incorporated by reference in its entirety for all purposes. Before providing the alert to the user, the mode of transportation can be determined and the alert delivered if the user is in a car, whereas, for example, the alert may not be delivered if the user is using public transportation. Moreover, driver identification, including real time driver identification can be performed and integrated with the methods and systems described herein.

As will be evident to one of skill in the art, for phone distraction, it is important to understand if the phone is being used by the driver. More generally, it may not always be appropriate to have such alerts play on a passenger's phone. Classifying whether the mobile device in motion in the vehicle belongs to the driver or to a passenger in a car can utilize driver identification methods such as those discussed in U.S. Pat. No. 9,398,423, the disclosure of which is hereby incorporated by reference in its entirety for all purposes. The methods for transport mode detection and driver/passenger classification could be implemented in real-time from the start of a trip, rather than only after a trip has completed, allowing these methods to be disabled if the classifier determines that the phone belongs to a passenger, or disabling some of the alerts but not others. One of ordinary skill in the art would recognize many variations, modifications, and alternatives.

Not stopping fully at a stop sign, i.e., a "rolling stop" or a stop for less than a threshold period of time (e.g., 3 seconds).

Thus, driving events may include, for example, distracted driving events, hard braking events, rapid acceleration events, speeding events, cornering events, and/or the like. For example, data from an accelerometer indicating rapid deceleration may be correlated to a hard braking event. In another example, data from an accelerometer indicating a high rate of acceleration may be correlated to a speeding event. In still another example, data from an accelerometer indicating movement or manipulation of the device by the driver within the vehicle during a drive may be correlated to a distracted driving event.

The driving events may also indicate positive driving behavior, such as a lack of hard braking events, a lack of speeding events, and/or a lack of distracted driving events. Thus, although some alerts are discussed in terms of negative feedback for actions that the user did incorrectly, embodiments of the present invention, for both reactive and proactive alerts, are not limited to negative feedback. To reinforce good habits, the system can play a positive message when the user exhibits good behavior, e.g., braking in time and carefully, stopping fully at a stop sign, etc.

Some embodiments combine data from several sources, for example, driver identification, vehicle dynamics, and the driver's interaction with the mobile device, for instance, touching the screen of the device or moving the device, while going through a corner or speeding. Cross-correlation between the classification of drivers and driving behavior and the driver's actions while driving provide benefits not available with conventional techniques. As an example, assume a person is texting for a total time of 5 seconds during a trip (e.g., because 5 seconds is the average eyes-off-road time when texting, according to a Virginia Tech Transportation Institute study, 2009). The average speed of the trip can be determined, and an alert can be delivered to let the driver better understand that their risky behavior effectively resulted in having their eyes closed for a predetermined portion (e.g., 5 seconds of eyes-off-road time at 55 mph would cover the length of a football field) of the trip. By using a mobile device to classify and correlate behaviors, the driver's behavior that cannot be determined using an external device mounted in the vehicle are available and useful. For instance, if the driver is touching the screen during driving, this can be ascertained by embodiments of the present invention whereas this data is not available using only an external, mounted device. Since the mobile device (e.g., the smartphone) is used as a trip capture device by embodiments of the present invention, device handling and use during the trip can be correlated with vehicle information in new ways as compared to conventional techniques.

In block 1245, the driver may be notified, for example, through the mobile device, of the one or more driving events using one or more alerts as described herein. The alert can be in real time, shortly after the driving event occurs, or after the drive is over. As an example of a real time alert, an alert may be pushed to the mobile device as soon as the mobile device is handled by the driver, or after the mobile device has been handled by the driver for a certain duration. As described in relation to proactive alerts, the alert can come in the form of, for example, an audio alert, a haptic alert, a visual alert, a push notification, in-application feedback, and/or the like. In some embodiments, the alerts may be customizable. For example, an audio alert may be provided in the voice of a family member to provide greater impact to the driver. In another example, the haptic alert may be customized to vibrate at a particular frequency, duration, pattern, strength, etc., such that the haptic alert of driver behavior may not be confused with another alert (e.g., a text message, phone call, etc.), which may vibrate in a different manner.

The audio alerts may be enabled, disabled, and configured. Audio alerts can take many forms, including GPS information, voice commands, the tone in which the message is delivered, the voice in which the message is delivered, and the like. Embodiments of the present invention enable A/B testing of various notification strategies, for example, notification during the trip versus push notification after the completion of the trip. The effectiveness of the educational messages can be measured by the results measured during subsequent drives by the driver. Alerts can be tested, with the most effective alerts (e.g., for a given driver) delivered to the user in a very user-centric manner. The effectiveness of the messages (e.g., hard braking summary after the trip versus real-time alert through the mobile device) may be measured and vary depending on the particular driving behavior that is being addressed. The A/B testing can be performed pre-production as well as ongoing in production in an on-going, continual manner, including cycles of identifying the driver, classifying behaviors, notifying the driver, measuring effectiveness and methods, and looping back to driver identification.

Push notifications can provide negative and/or positive feedback regarding the one or more driving events. In some embodiments, feedback is given immediately (i.e., in real time), whereas in other embodiments, the feedback is delayed until later in the drive, after the drive, on a periodic basis, after a certain duration of observed behavior (e.g., 30 total seconds of mobile device usage, 5 hard brakes, etc.) or the like. The processing mode in which the system operates, for example, post-processing after the drive, real-time processing during the drive, or the like can be varied depending on circumstances. As an example, if the mobile device is stationary, data can be collected and stored for later processing. However, if the mobile device is picked up, processing could shift to real-time processing either in the cloud, on the server, on the mobile device, a combination thereof, or the like. In one approach, data is sent from the mobile device to a server at the end of the trip and then processed by the server. After processing, the notifications and/or alerts may be sent to the mobile device for display or presentation to the user. In other approaches, some of the processing of the data is performed on the mobile device and notifications are surfaced to the user in real-time. In these implementations, some of the processing can be performed off the mobile device and results sent back as appropriate. In some embodiments, one or more alerts and/or notifications may be temporarily or permanently dismissed or turned off by shaking the mobile device. One of ordinary skill in the art would recognize many variations, modifications, and alternatives.

In block 1250, after the driver is notified, subsequent behavior data may be collected. At step 1255, changes in behavior are determined using, in one example, A/B testing. For example, if an audio alert for a "hard brake" was provided in block 1245, subsequent acceleration data can be collected and analyzed to determine whether any hard braking occurred after the notification. The results of this analysis may be used to determine the efficacy of the notification in modifying or improving the driver's driving behavior. The type and timing of future notifications to the driver can be modified based on the efficacy of previous notifications.

In block 1260, an optional step, the drive can be scored based on the driving events, as well as on overall driving behavior, and can be displayed to the driver in one embodiment. This score may be used to educate the driver on what good and risky driving behavior is and how s/he compares to other drivers. For example, a low score may be given for a driver who has 15 hard brakes in 100 miles, while the national average is 10 hard brakes or less per 100 miles. Further disclosure regarding the scoring of driving trips can be found in U.S. Pat. No. 11,072,339, the disclosure of which is hereby incorporated by reference in its entirety for all purposes. The other applications incorporated by reference can be useful in determining if a trip is insurable, including trip capture, driver identification, modes of transportation, and the like.

It should be appreciated that the specific steps illustrated in FIG. 12 provide a particular method of providing reactive alerts to inform drivers of events that have happened according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Specific details are given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code, or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein, the term "memory" refers to any type of volatile, non-volatile, or other storage medium and is not to be limited to any particular type of memory, number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices, and/or other machine readable mediums for storing information. The term "computer-readable medium" includes, but is not limited to, portable or fixed storage devices, optical storage devices, and/or various other storage mediums capable of storing that contain or carry instruction(s) and/or data.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for providing proactive driving alerts to a user in a vehicle, the method comprising:
   receiving, from one or more sensors of a mobile device present in the vehicle during a drive, a current speed of the vehicle, a current travel direction of the vehicle, and a current location of the vehicle with respect to a road network;
   receiving contextual data, wherein the contextual data indicates a plurality of triggering conditions located along one or more road segments present in the road network;
   identifying, from the one or more road segments, a road segment of interest based on the current location of the vehicle and the current travel direction of the vehicle;
   identifying, from the plurality of triggering conditions, a triggering condition in a vicinity of the road segment of interest;
   determining that the triggering condition is present along the road segment of interest based on a location of the triggering condition with respect to the road segment of interest;
   receiving a predefined threshold deceleration rate for the vehicle;
   determining a distance between the current location of the vehicle and the location of the triggering condition;
   determining, based on the current speed of the vehicle and the distance, that a minimum deceleration rate from the current speed of the vehicle to a desired speed at the location of the triggering condition is greater than or equal to the predefined threshold deceleration rate for the vehicle; and
   outputting, in real time in response to determining that the minimum deceleration rate is greater than or equal to the predefined threshold deceleration rate for the vehicle, a proactive alert related to the triggering condition to the user using the mobile device.

2. The method of claim 1 wherein the vehicle is operated by a driver, and the method further comprises:
   detecting that the user of the mobile device is the driver, wherein outputting the proactive alert is further based on detecting that the user of the mobile device is the driver.

3. The method of claim 1 wherein the mobile device comprises at least one of a mobile phone or a hardware device affixed to the vehicle.

4. The method of claim 1 wherein the contextual data includes information related to at least one of road type, map data, weather conditions, real-time or historical traffic conditions, time-of-day, or accident statistics.

5. The method of claim 1 wherein the method is performed by an application running on the mobile device, wherein the application is not foregrounded by the user.

6. The method of claim 1 wherein the method is performed by an application running on the mobile device, wherein the application has not been launched by the user.

7. The method of claim 1 wherein the proactive alert comprises an alert modality and a set of alert characteristics.

8. The method of claim 1 further comprising determining an audio route from among a plurality of audio routes, wherein providing the proactive alert comprises delivering the proactive alert through the determined audio route.

9. The method of claim 1 wherein the proactive alert comprises negative feedback.

10. The method of claim 1 further comprising selecting a set of active alerts consisting of a subset of a set of alerts.

11. The method of claim 1, wherein providing the proactive alert includes:
    determining an alert modality for the proactive alert;
    determining a set of alert characteristics for the determined alert modality; and
    delivering the proactive alert with the determined alert modality and the determined set of alert characteristics.

12. The method of claim 11 wherein determining the alert modality comprises:
    displaying a set of alert modalities to the user of the mobile device;
    receiving a selection of one of the set of alert modalities; and
    storing the determined alert modality in a memory.

13. The method of claim 11 wherein determining the set of alert characteristics comprises:
    displaying a plurality of alert characteristics to the user of the mobile device;
    receiving a selection of one or more of the plurality of alert characteristics; and
    storing the one or more of the plurality of alert characteristics as the set of alert characteristics in a memory.

14. The method of claim 11 wherein the alert modality corresponds to at least one of an acoustic, visual, vibration, or haptic alert.

15. The method of claim 11 wherein the set of alert characteristics includes at least one of alert volume, tone of voice, strength of haptic motion, alert duration, or alert delivery time.

16. The method of claim 11 wherein the proactive alert comprises positive feedback.

17. The method of claim 1, further comprising determining an effectiveness of previous proactive alerts output before the proactive alert, wherein outputting the proactive alert comprises selecting a set of alert characteristics for the proactive alert based on the effectiveness of the previous proactive alerts.

18. The method of claim 1, wherein determining the distance between the current location of the vehicle and the location of the triggering condition comprises subtracting a buffer distance from an actual distance from the current location of the vehicle to the location of the triggering condition.

19. The method of claim 1, wherein at least one of the current speed, the current travel direction, or the current location is obtained from at least one Global Navigation Satellite System of the Global Positioning System, Galileo, GLONASS, or BeiDou.

\* \* \* \* \*